US006935724B2

(12) United States Patent
Silverbrook

(10) Patent No.: US 6,935,724 B2
(45) Date of Patent: Aug. 30, 2005

(54) INK JET NOZZLE HAVING ACTUATOR WITH ANCHOR POSITIONED BETWEEN NOZZLE CHAMBER AND ACTUATOR CONNECTION POINT

(75) Inventor: Kia Silverbrook, Balmain (AU)

(73) Assignee: Silverbrook Research Pty LTD, Balmain (AU)

( * ) Notice: Subject to any disclaimer, the term of this patent is extended or adjusted under 35 U.S.C. 154(b) by 52 days.

(21) Appl. No.: 10/698,412

(22) Filed: Nov. 3, 2003

(65) Prior Publication Data

US 2004/0090494 A1 May 13, 2004

Related U.S. Application Data

(63) Continuation-in-part of application No. 10/160,273, filed on Jun. 4, 2002, now Pat. No. 6,746,105, which is a continuation of application No. 09/112,767, filed on Jul. 10, 1998, now Pat. No. 6,416,167.

(30) Foreign Application Priority Data

Jul. 15, 1997 (AU) .............................................. PO7991
Mar. 25, 1998 (AU) .............................................. PP2592

(51) Int. Cl.[7] .............................................. B41J 2/04
(52) U.S. Cl. ...................................................... 347/54
(58) Field of Search ............................. 347/20, 44, 47, 347/54, 56, 63, 65, 67, 40; 60/527–529

(56) References Cited

U.S. PATENT DOCUMENTS

| 1,941,001 A | 12/1933 | Hanseli ........................ 346/47 |
| 3,373,437 A | 3/1968 | Sweet et al. ................... 347/74 |
| 3,596,275 A | 7/1971 | Sweet ........................... 347/44 |
| 3,683,212 A | 8/1972 | Zoltan .......................... 310/324 |
| 3,747,120 A | 7/1973 | Stemme ......................... 347/70 |
| 3,946,398 A | 3/1976 | Kyser et al. ................... 347/10 |
| 4,423,401 A | 12/1983 | Mueller ......................... 337/104 |

(Continued)

FOREIGN PATENT DOCUMENTS

| DE | 1 648 322 | 3/1971 |
| DE | 29 05 063 | 8/1980 |

(Continued)

OTHER PUBLICATIONS

Noworolski, J. Mark et al, "Process for in–plane and out–of–plane single–crystal–silicon thermal microactuators". Sensors and Actuators, A, CH, Elsevier Sequoia S.A., Lausanne, vol. 55, No. 1, Jul. 15, 1996, pp. 65–69, XP004077979 ISSN: 0924–4247.

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp 146–150, XP000443412, ISSN: 1057–7157.

Yamagata, Yutaka et al, "A Micro Mobile Mechanism Using Thermal Expansion and its Theoretical Analysis". Proceeding of the workshop on micro electro mechanical systems (MEMS), US, New York, IEEE, vol. Workshop 7, Jan. 25, 1994, pp 142–147, XP000528408, ISBN: 0–7803–1834–X.

Primary Examiner—Juanita D. Stephens

(57) ABSTRACT

A nozzle arrangement having a nozzle camber for holding ink. A passive anchor and an active anchor extend from respective anchor points and support a moveable structure including a portion in fluid communication with the ink chamber. The moveable structure is connected to the passive and active anchors at connection points distal the respective anchor points such that actuation of the active anchor causes displacement of the portion with respect to the ink chamber. The anchor point of at least one of the active and passive anchors is positioned between the nozzle chamber and the connection points.

15 Claims, 35 Drawing Sheets

U.S. PATENT DOCUMENTS

| | | | |
|---|---|---|---|
| 4,459,601 A | 7/1984 | Howkins | 347/68 |
| 4,490,728 A | 12/1984 | Vaught et al. | 347/68 |
| 4,553,393 A | 11/1985 | Ruoff | 60/528 |
| 4,584,590 A | 4/1986 | Fischbeck et al. | 347/69 |
| 4,672,398 A | 6/1987 | Kuwabara et al. | 347/48 |
| 4,737,802 A | 4/1988 | Mielke | 347/54 |
| 4,864,824 A | 9/1989 | Gabriel et al. | 60/527 |
| 4,899,181 A | 2/1990 | Hawkins et al. | 347/63 |
| 5,029,805 A | 7/1991 | Albarda et al. | 251/11 |
| 5,258,774 A | 11/1993 | Rogers | 347/40 |
| 5,666,141 A | 9/1997 | Matoba et al. | 347/54 |
| 5,719,604 A | 2/1998 | Inui et al. | 347/54 |
| 6,416,167 B1 | 7/2002 | Silverbrook | 347/54 |
| 6,536,874 B1 * | 3/2003 | Silverbrook | 347/54 |

FOREIGN PATENT DOCUMENTS

| | | | |
|---|---|---|---|
| DE | 32 45 283 | 6/1984 | |
| DE | 34 30 155 | 2/1986 | |
| DE | 37 16 996 | 12/1988 | |
| DE | 39 34 280 | 4/1990 | |
| DE | 43 28 433 | 3/1995 | |
| DE | 195 16 997 | 11/1995 | |
| DE | 195 17 969 | 11/1995 | |
| DE | 195 32 913 | 3/1996 | |
| DE | 196 23 620 | 12/1996 | |
| DE | 196 39 717 | 4/1997 | |
| EP | 0 092 229 | 10/1983 | |
| EP | 0 398 031 | 11/1990 | |
| EP | 0 427 291 | 5/1991 | |
| EP | 0 431 338 | 6/1991 | |
| EP | 0 478 956 | 4/1992 | |
| EP | 0 506 232 | 9/1992 | |
| EP | 0 510 648 | 10/1992 | |
| EP | 0 627 314 | 12/1994 | |
| EP | 0 634 273 | 1/1995 | |
| EP | 0 737 580 | 10/1996 | |
| EP | 0 750 993 | 1/1997 | |
| EP | 0 713 774 | 5/1998 | |
| EP | 0 882 590 | 12/1998 | |
| FR | 2 231 076 | 12/1974 | |
| GB | 792 145 | 3/1958 | |
| GB | 1 428 239 | 3/1976 | |
| GB | 2 007 162 | 5/1979 | |
| GB | 2 262 152 | 6/1993 | |
| JP | 58 112747 | 7/1983 | |
| JP | 58 116165 | 7/1983 | |
| JP | 61 025849 | 2/1986 | |
| JP | 61 268453 | 11/1986 | |
| JP | 01 105748 | 4/1989 | |
| JP | 01 115639 | 5/1989 | |
| JP | 01 128839 | 5/1989 | |
| JP | 01 257058 | 10/1989 | |
| JP | 01 306254 | 12/1989 | |
| JP | 02 050841 | 2/1990 | |
| JP | 2-92643 | 4/1990 | |
| JP | 2-108544 | 4/1990 | |
| JP | 02 162049 | 6/1990 | |
| JP | 02 158348 | 8/1990 | |
| JP | 2-265752 | 10/1990 | |
| JP | 03 65348 | 3/1991 | |
| JP | 03 112662 | 5/1991 | |
| JP | 03 180350 | 8/1991 | |
| JP | 404001051 A | 1/1992 | B41J/2/045 |
| JP | 04 118241 | 4/1992 | |
| JP | 04 126255 | 4/1992 | |
| JP | 04 141429 | 5/1992 | |
| JP | 4-353458 | 12/1992 | |
| JP | 04 368851 | 12/1992 | |
| JP | 05 284765 | 10/1993 | |
| JP | 05 318724 | 12/1993 | |
| JP | 6-91865 | 4/1994 | |
| JP | 6-91866 | 4/1994 | |
| JP | 07 314665 | 12/1995 | |
| WO | WO 94 18010 | 8/1994 | |
| WO | WO 97 12689 | 4/1997 | |

* cited by examiner

INK JET NOZZLE HAVING ACTUATOR WITH ANCHOR POSITIONED BETWEEN NOZZLE CHAMBER AND ACTUATOR CONNECTION POINT

CROSS-REFERENCE TO RELATED APPLICATIONS

This is a Continuation-In-Part Application of U.S. Ser. No. 10/160,273, filed on Jun. 4, 2002, now Issued U.S. Pat. No. 6,746,105, which is a Continuation Application of U.S. Ser. No. 09/112,767, filed on Jul. 10, 1998, now Issued U.S. Pat. No. 6,416,167.

FIELD OF INVENTION

The present invention relates to a nozzle arrangement for a microelectromechical system ('MEMS') inkjet printhead.

BACKGROUND OF THE INVENTION

In the MEMS nozzle arrangement described in U.S. Pat. No. 6,243,113 "Image Creation Method and Appartus" (the contents of which are incorporated herein by cross reference), an ink chamber is provided with an ink inlet and an ink ejection port, which are coaxial. The ink ejection port is provided through thermal actuator that incorporates a paddle mounted to a substrate by a passive anchor and an active anchor. The active anchor includes a resistive element that heats up upon application of a current. This heating causes expansion of the active anchor, whilst the passive anchor is sufficiently shielded from the generated heat that it remains the same length. The change in relative lengths of the anchors is amplified by the geometric position of the anchors with respect to each other, such that the paddle can selectively be displaced with respect to the ink chamber by applying a suitable drive current to the active anchor.

Upon actuation, the paddle is urged towards the ink chamber, causing an increase in pressure in the ink in the chamber. This in turn causes ink to bulge out of the ink ejection port. When the drive current is removed, the active anchor quickly cools, which in turn causes the paddle to return to its quiescent position. The inertia of the moving ink bulge causes a thinning and breaking of the ink surface adjacent the ink ejection port, such that a droplet of ink continues moving away from the port as the paddle moves back to its quiescent position. As the quiescent position is reached, surface tension of a concave meniscus across the ink ejection port causes ink to be drawn in to refill the ink chamber via the ink inlet. Once the ink chamber is full, the process can be repeated.

One difficulty with prior art devices of this type is that the actuators add to the total surface area required for each nozzle. It would be desirable to reduce the surface area required for each nozzle arrangement, since this would allow increased nozzle arrangement density on a printhead.

SUMMARY OF INVENTION

In accordance with the invention, there is provided a nozzle arrangement for an inkjet printhead, the nozzle arrangement including:
(a) a nozzle chamber for holding ink;
(b) a passive anchor and an active anchor extending from respective anchor points;
(c) a moveable structure including a portion in fluid communication with the ink chamber, the moveable structure being connected to the passive and active anchors at connection points distal the respective anchor points such that actuation of the active anchor causes displacement of the portion with respect to the ink chamber;
(d) a fluid ejection port in fluid communication with the ink chamber for enabling ejection of ink from the chamber by the portion upon actuation of the active anchor;
wherein the anchor point of at least one of the active and passive anchors is positioned between the nozzle chamber and the connection points.

Preferably, the moveable structure is moved within a first action plane upon actuation. More preferably, the movement includes a rotational component.

In a preferred embodiment, the active anchor is a thermal actuator configured to expand due to self-heating when a current is passed therethrough. Preferably, the active anchor is a thermal bend actuator. It is particularly preferred that there is provided more than one of each of the passive and/or active anchors.

Preferably, the moveable structure is supported at least in part by the passive and active anchors. More preferably, ink in the chamber provides fluidic support to the moveable structure by way of surface tension and/or fluid pressure.

In a preferred embodiment, the active anchor is configured to supply, upon actuation, a compressive force between its anchor point and connection point. Preferably, the compressive force is supplied substantially parallel to the plane.

Other preferred aspects, features and embodiments of the invention are described in the detailed description below.

BRIEF DESCRIPTION OF THE DRAWINGS

A preferred embodiment of the invention will now be described, by way of example only, with reference to the accompanying drawings, in which.

DETAILED DESCRIPTION OF THE DRAWINGS

Figure 1:
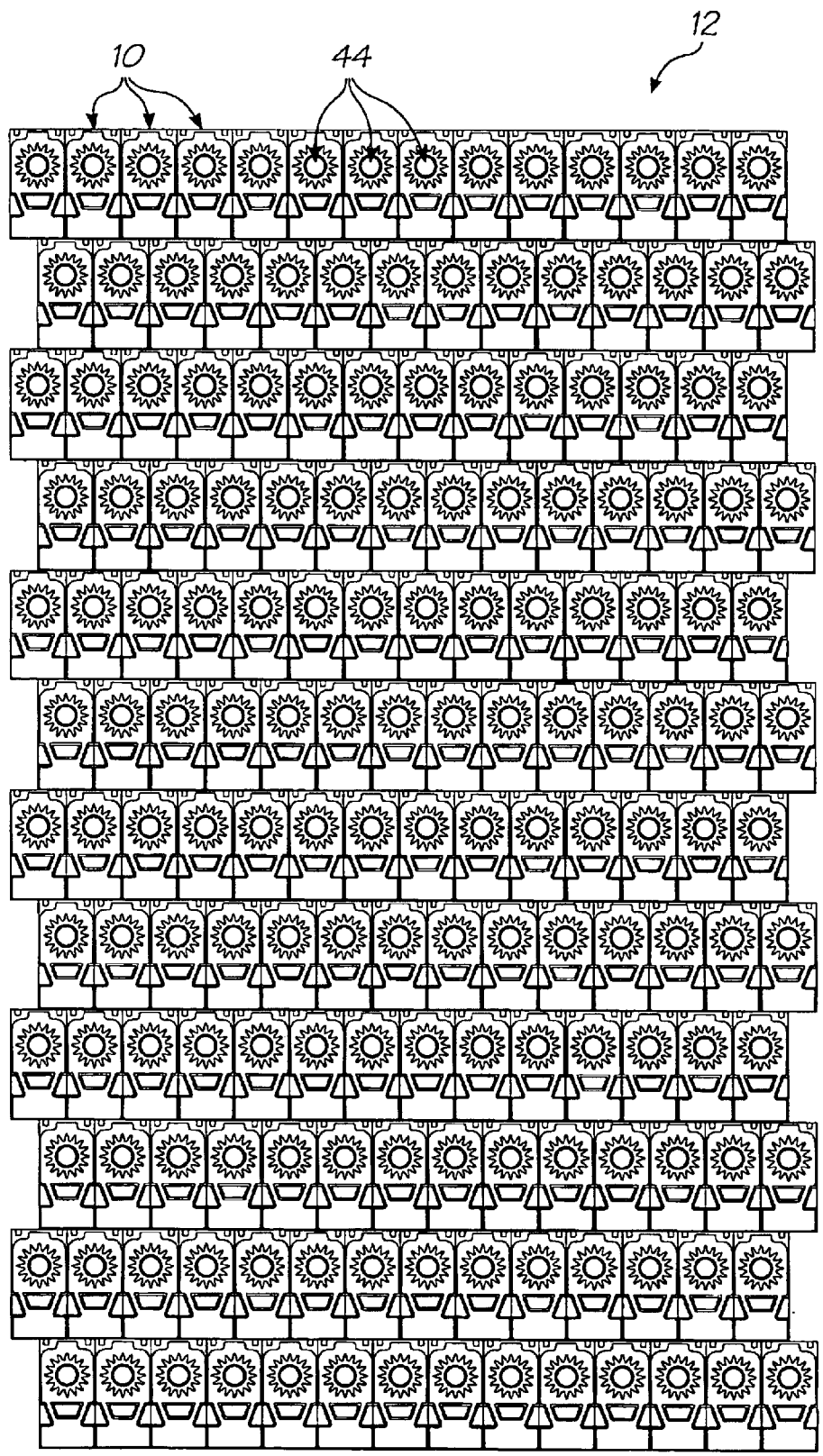
FIG. 1 shows a plan view of an ink jet printhead chip of the invention.
Figure 2:
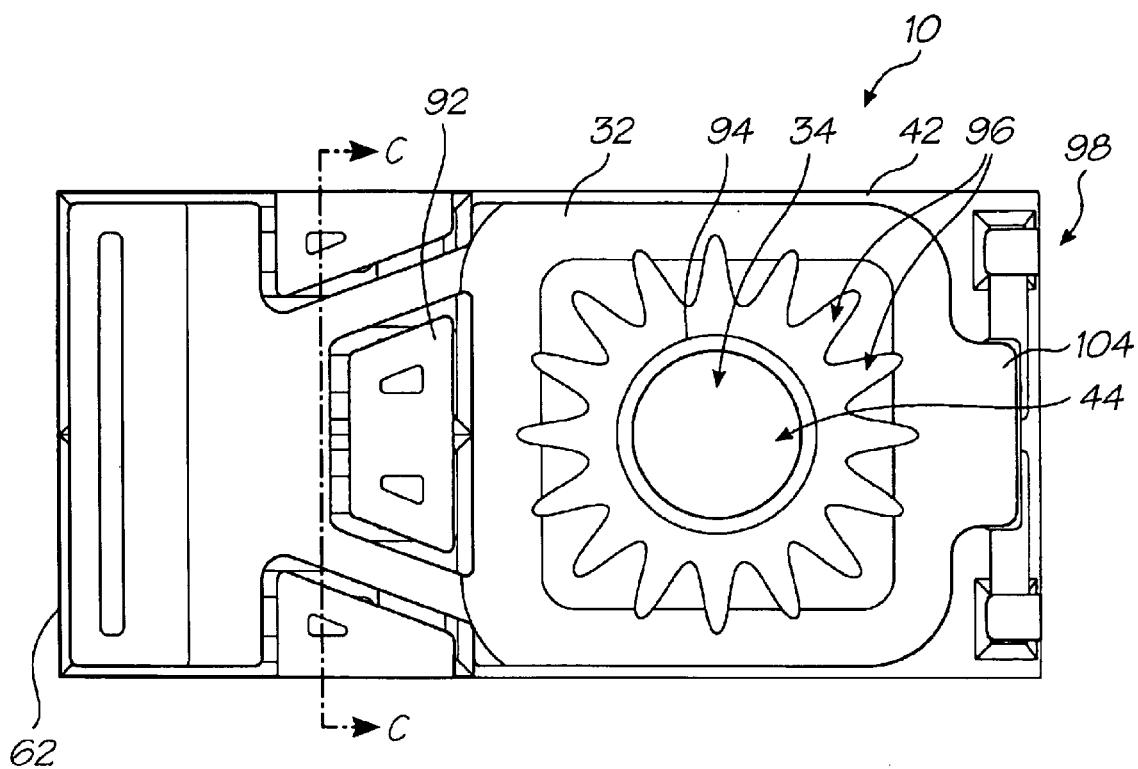
FIG. 2 shows a plan view of one nozzle arrangement of the ink jet printhead chip.
Figure 3:
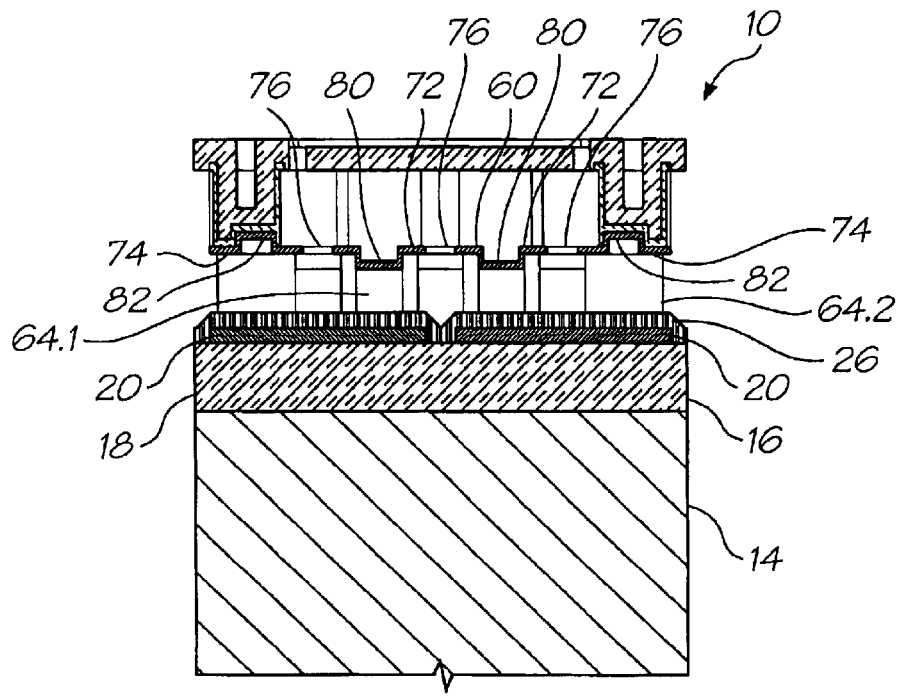
FIG. 3 shows a sectioned view of the nozzle arrangement taken through C—C in FIG. 2.
Figure 4:
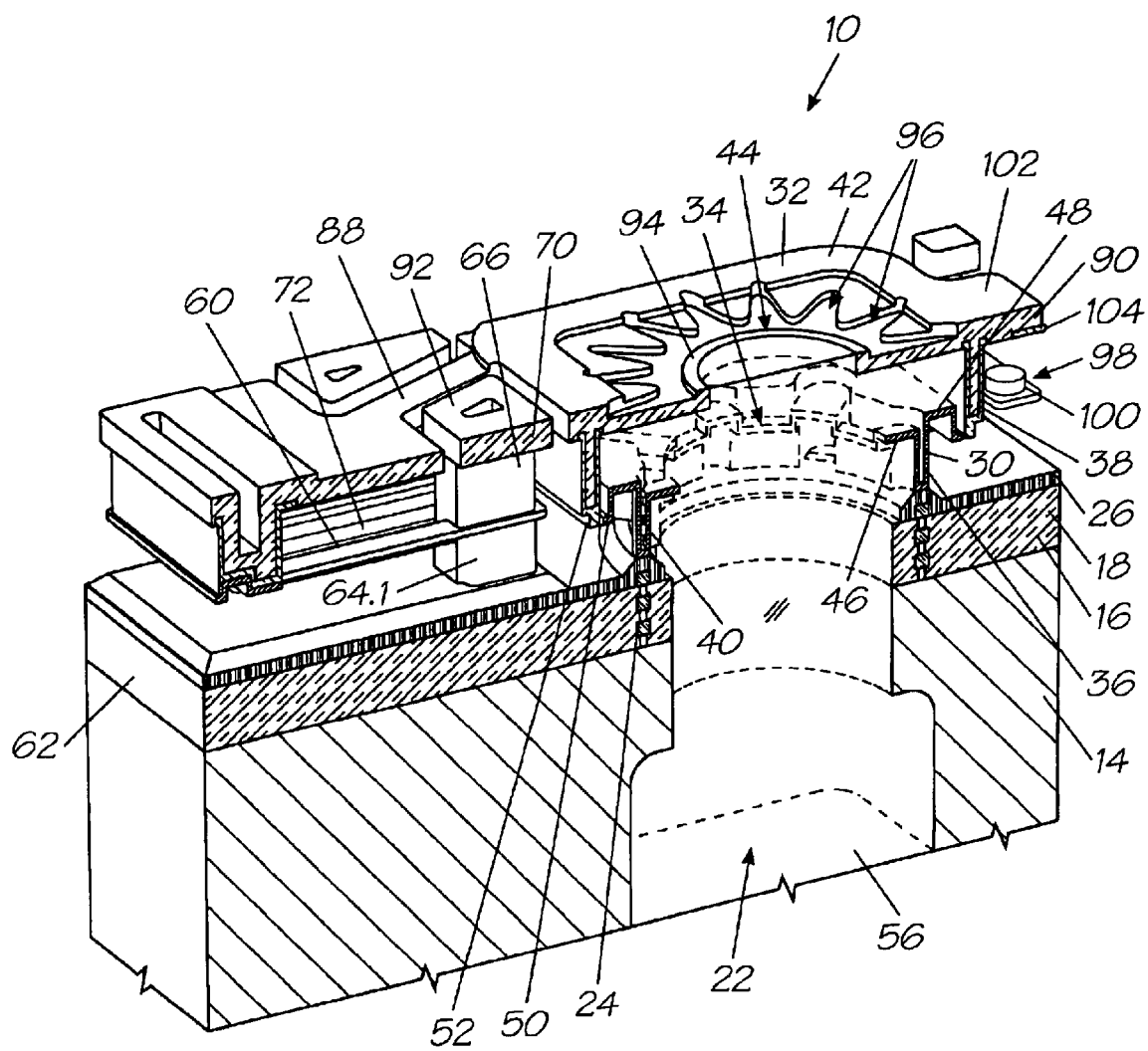
FIG. 4 shows a three-dimensional sectioned view of the nozzle arrangement.

In FIGS. 1 to 7, reference numeral 10 generally indicates a nozzle arrangement for an ink jet print head chip 12, part of which is shown in FIG. 1.

The nozzle arrangement 10 is the product of an integrated circuit fabrication technique. In particular, the nozzle arrangement 10 defines a micro-electromechanical system (MEMS).

In this description, only one nozzle arrangement 10 is described. This is simply for clarity and ease of description. A print head having one or more print head chips 12 can incorporate up to 84000 nozzle arrangements 10. Further, as is clear from FIG. 1, the print head chip 12 is a multiple replication of the nozzle arrangement 10. It follows that the following detailed description of the nozzle arrangement 10 and the manner of its fabrication adequately describes the print head chip 12.

The ink jet print head chip 12 includes a silicon wafer substrate 14. 0.35 Micron 1 P4M 12 volt CMOS microprocessing circuitry is positioned on the silicon wafer substrate 14. The circuitry is shown as a drive circuitry layer 16.

A silicon dioxide or glass layer 18 is positioned on the wafer substrate 14. The layer 18 defines CMOS dielectric layers. CMOS top-level metal defines a pair of aligned aluminum electrode contact layers 20 positioned on the silicon dioxide layer 18. Both the silicon wafer substrate 14 and the silicon dioxide layer 18 are etched to define an ink inlet channel 22 having a circular cross section. An aluminum diffusion barrier 24 of CMOS metal 1 CMOS metal 2/3 and CMOS top level metal is positioned in the silicon dioxide layer 18 about the ink inlet channel 22. The barrier 24 serves to inhibit the diffusion of hydroxyl ions through CMOS oxide layers of the drive circuitry layer 16.

A portion of the diffusion barrier 24 extends from the silicon dioxide layer 18. An ink passivation layer in the form of a layer of silicon nitride 26 is positioned over the aluminum contact layers 20 and the silicon dioxide layer 18, as well as the diffusion barrier 24. Each portion of the layer 26 positioned over the contact layers has an opening 28 defined therein to provide access to the contacts 20.

The nozzle arrangement 10 includes a static structure 40 and a dynamic structure 42 that together define a nozzle chamber 34. The static structure 40 defines a fixed part 36 of a nozzle chamber wall 30 that extends from the layer 26 of silicon nitride and bounds the ink inlet channel 22. The dynamic structure 42 defines a movable part 38 of the nozzle chamber wall 30 and a roof wall 32. The roof wall 32 defines an ink ejection port 44.

The movable part 38 of the nozzle chamber wall 30 overlaps the fixed part 36 of the nozzle chamber wall 30. The fixed part 36 defines an inwardly directed lip 46 that extends into the nozzle chamber 34. The fixed part 36 also defines an outwardly directed, re-entrant portion 48 that terminates in a radially extending rim 50. The movable part 38 depends from the roof wall 32 and terminates at a free edge 52.

Figure 5:
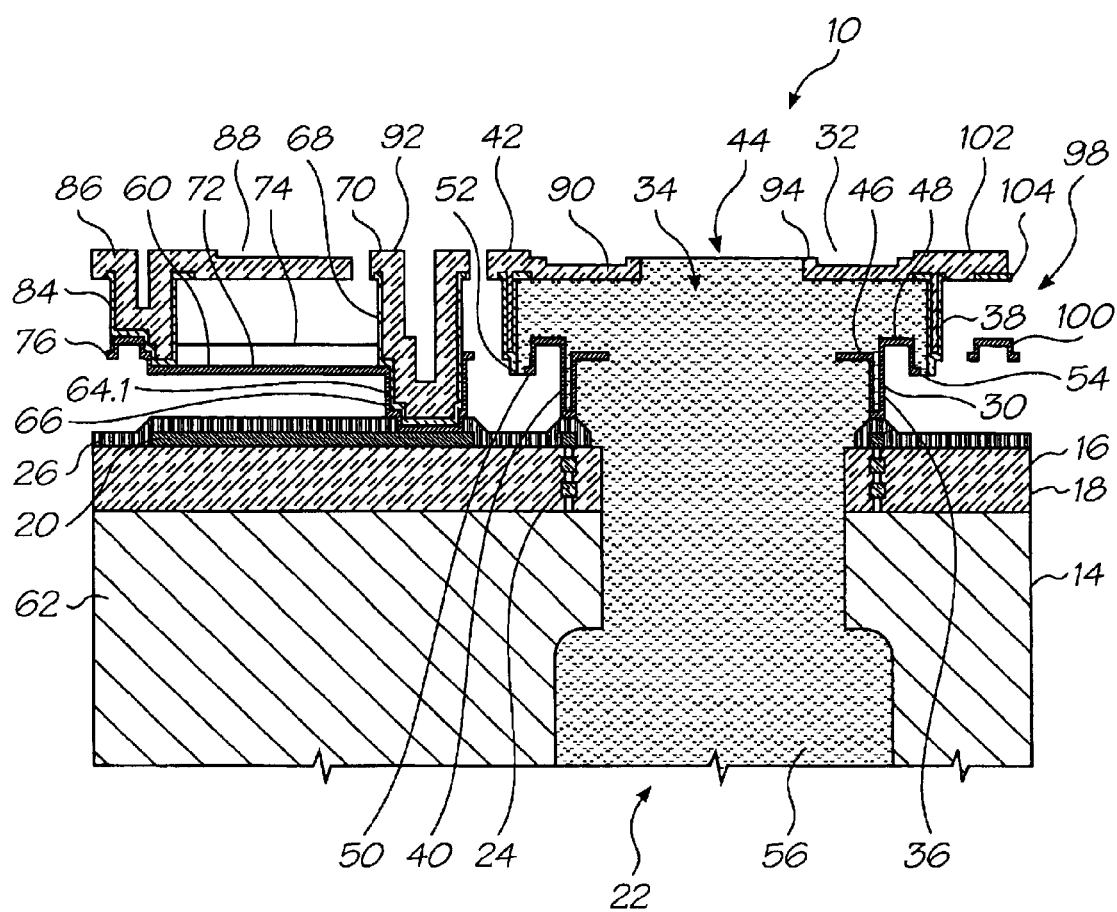
FIG. 5 shows a side sectioned view of the nozzle arrangement in a pre-ejection quiescent condition.
Figure 6:
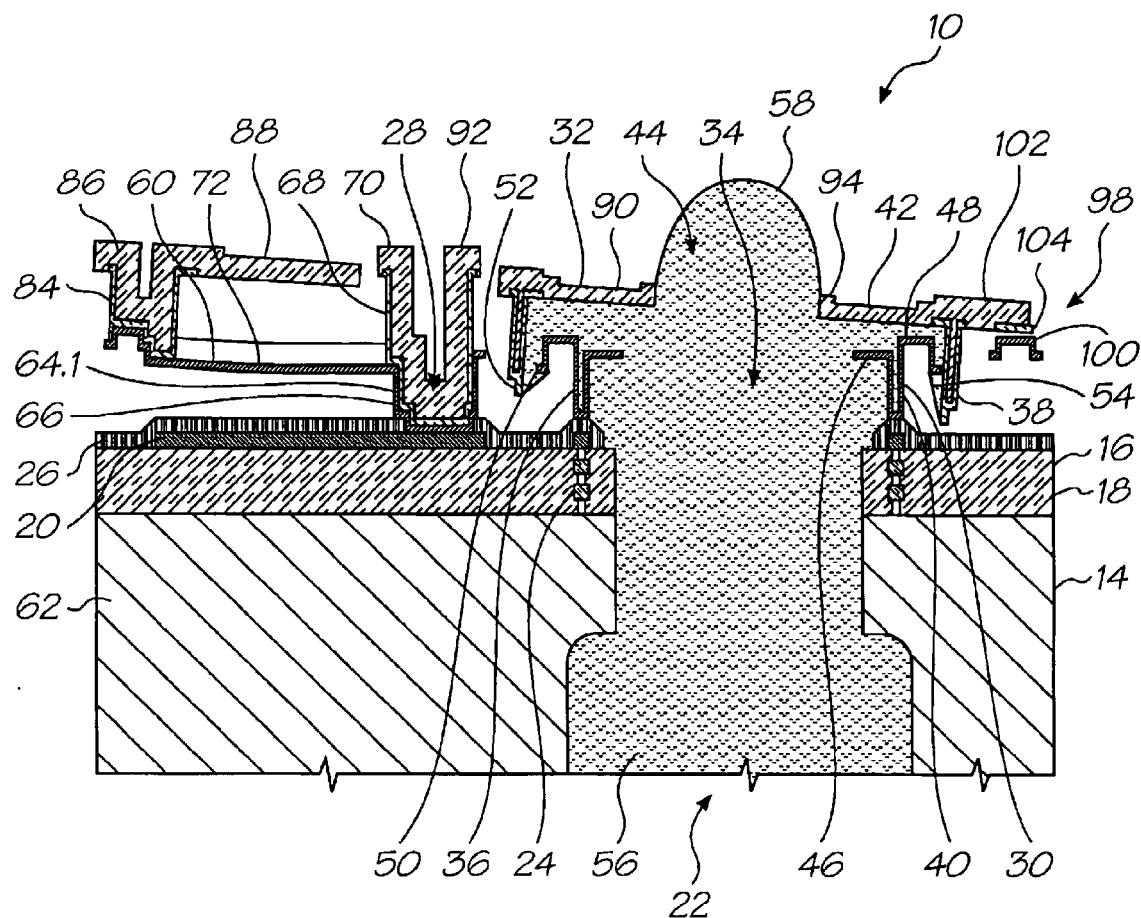
FIG. 6 shows a side sectioned view of the nozzle arrangement of FIG. 2 in an operative condition.
Figure 7:
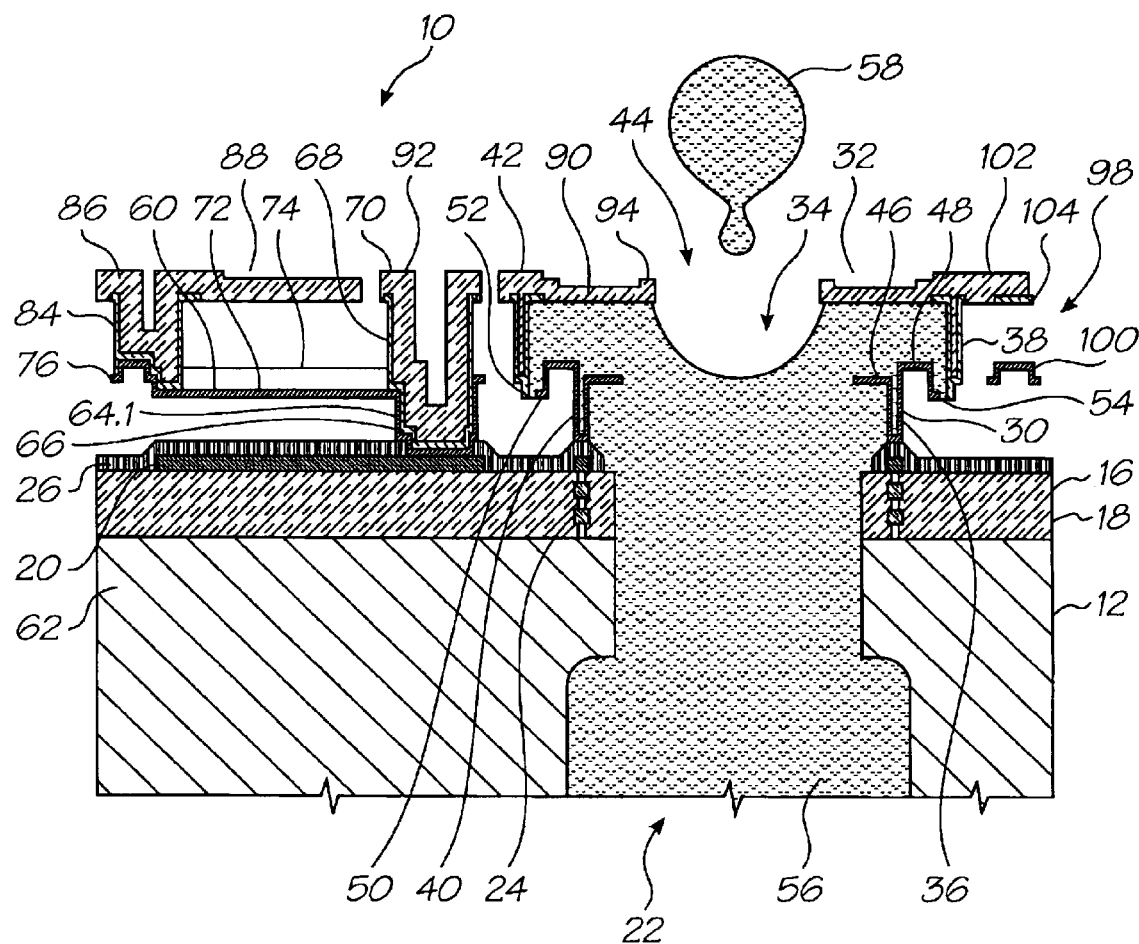
FIG. 7 shows a side sectioned view of the nozzle arrangement of FIG. 2 in a post-ejection quiescent condition.

As can be seen in FIGS. 5 and 7, the free edge 52 is aligned with the rim 50 when the nozzle arrangement 10 is in a quiescent condition. As can be seen in FIG. 6, the free edge 52 extends past the rim 50 when the nozzle arrangement 10 is in an operative condition. A meniscus 54 extends from the rim 50 to the free edge 52 when the nozzle chamber 34 is filled with ink 56. As can be seen in the FIG.'s, the meniscus 54 is stretched to accommodate movement of the dynamic structure 42 towards and away from the substrate 14. It will be appreciated that the dimensions of the components that make up the nozzle arrangement 10 are microscopic. At this scale, surface tension effects are significant enough to inhibit leakage of ink 56 between the rim 50 and the free edge 52. It follows that when the nozzle chamber 34 is filled with the ink 56, the rim 50 and the free edge 52 define a fluidic seal.

As shown in FIGS. 5 to 7, when the dynamic structure 42 is urged towards the substrate 14, an ink drop 58 is formed. When the dynamic structure 42 returns to a quiescent condition, the ink drop 58 separates from the ink 56 in the nozzle chamber 34 and the nozzle chamber 34 is refilled with ink 56.

A thermal actuator 60 is electrically connected to both the contact layers at the openings 28. The openings 28 are positioned between the ink inlet channel 22 and one side 62 of the nozzle arrangement 10. The openings 28 are positioned closer to the ink inlet channel 22 than to the side 62. The thermal actuator 60 is of titanium aluminum nitride. Further, the thermal actuator 60 has four anchor portions 64 that extend from the silicon nitride layer 26 to a predetermined point spaced from the silicon nitride layer 26. The anchor portions 64 are aligned transversely with respect to the substrate 14. The anchor portions 64 define a pair of active anchor portions 64.1 positioned between a pair of spaced passive anchor portions 64.2.

Each of the active anchor portions 64.1 is positioned at respective openings 28. Further, each active anchor portion 64.1 is electrically connected to one respective contact 20 to define a via 66. Each via 66 includes a titanium layer 68 and the active anchor portion 64.1 sandwiched between a layer 70 of dielectric material in the form of low temperature silicon nitride and one respective contact 20.

Each of the passive anchor portions 64.2 is retained in position by being sandwiched between the layer 70 of low temperature silicon nitride and the silicon nitride layer 26. Generally, the structure of the active anchor portions 64.1 and the vias 66 are similar to the structure of the layer 70 in combination with the passive anchor portions 64.2. However, the absence of the openings 28 at the passive anchor portions 64.2 ensures that electrical contact between the thermal actuator 60 and the contacts 20 is not made. This is enhanced by the fact that silicon nitride is a dielectric material.

Details of the thermal actuator 60 are shown in FIGS. 2 to 7. The thermal actuator 60 includes a pair of inner actuator arms 72 and a pair of outer actuator arms 74. Each inner actuator arm 72 is connected to a free end of a respective active anchor portion 64.1. Similarly, each outer actuator arm 74 is connected to a free end of a respective passive anchor portion 64.2. The actuator arms 72, 74 extend from the anchor portions 64 in a plane that is generally parallel to a plane of the wafer substrate 14, towards the one side 62 of the nozzle arrangement 10. The actuator arms 72, 74 terminate at a common bridge portion 76.

Each inner actuator arm 72 includes a planar section 80 that is positioned in a plane parallel to that of the wafer substrate 14. Each outer actuator arm 74 includes a planar section 82 that is positioned in a plane parallel to that of the wafer substrate 14. The bridge portion 76 interconnects the planar sections 80, 82.

The arms 72, 74 and the bridge portion 76 are configured so that, when a predetermined electrical current is applied to the inner actuator arms 72, the inner actuator arms 72 are heated to the substantial exclusion of the outer actuator arms 74. This heating results in an expansion of the inner actuator arms 72, also to the exclusion of the outer actuator arms 74. As a result, a differential expansion is set up in the actuator arms 72, 74. The differential expansion results in the actuator arms 72, 74 bending away from the layer 26 of silicon nitride.

A layer 84 of titanium is positioned on the bridge portion 76. A layer 86 of dielectric material in the form of low temperature silicon nitride is positioned on the layer 84. This layer 86 is connected to, and forms part of, the layer 70 to define a lever arm structure 88. A layer 90 of dielectric material defines the roof wall 32. The layer 90 forms part of, and is connected to, the layer 86. The anchor portions 64, the titanium layers 68 and the layer 70 of dielectric material define a fulcrum formation 92. Thus, the dynamic structure 42 is displaced towards the substrate 14 when the actuator 60 is displaced away from the substrate 14. It follows that resultant differential expansion causes the actuator 60 to move away from the substrate 14 and the roof wall 32 to compress the ink 56 in the nozzle chamber 34 so that the ink drop 58 is ejected when an electrical current is set up in the actuator 60. Differential contraction causes the actuator 60 to move towards the substrate 14 and the roof wall 32 to move upwards, separating the drop 58.

A nozzle rim 94 bounds the ink ejection port 44. A plurality of radially extending recesses 96 is defined in the roof wall 32 about the rim 94. These serve to contain radial ink flow as a result of ink escaping past the nozzle rim 94.

The nozzle arrangement 10 includes a test switch arrangement 98. The test switch arrangement 98 includes a pair of titanium aluminum nitride contacts 100 that is connected to test circuitry (not shown) and is positioned at a predetermined distance from the wafer substrate 14. The dynamic structure 42 includes an extended portion 102 that is opposed to the fulcrum formation 92 with respect to the roof wall 32. A titanium bridging member 104 is positioned on the extended portion 102 so that, when the dynamic structure 42 is displaced to a maximum extent towards the wafer substrate 14, the titanium bridging member 104 abuts the contacts 100 to close the test switch arrangement 98. Thus, operation of the nozzle arrangement 10 can be tested.

In use, a suitable voltage, typically 3V to 12V depending on the resistivity of the TiAlNi and characteristics of the CMOS drive circuitry is set up between the active anchor portions 64.1. This results in a current being generated in the inner actuator arms 72 and a central part of the bridge portion 76. The voltage and the configuration of the inner actuator arms 72 are such that the current results in the inner actuator arms 72 heating. As a result of this heat, the titanium aluminum nitride of the inner actuator arms 72 expands to a greater extent than the titanium aluminum nitride of the outer actuator arms 74. This results in the actuator arms 72, 74 bending as shown in FIG. 6. Thus, the dynamic structure 42 tilts towards the wafer substrate 14 to eject the ink drop 58.

A voltage cut-off results in a rapid cooling of the inner actuator arms 72. The actuator arms 72 subsequently contract causing the actuator arms 72 to straighten. The dynamic structure 42 returns to an original condition as shown in FIG. 7. This return of the dynamic structure 42 results in the required separation of the drop 58.

The print head chip 12 incorporates a plurality of nozzle arrangements 10 as shown in FIG. 1. It follows that, by connecting the nozzle arrangements 10 to suitable micro processing circuitry and a suitable control system, printing can be achieved. A detail of the manner in which the nozzle arrangements 10 are connected to such components is described in the above referenced patents/patent applications and is therefore not set out in any detail in this specification. It is to be noted, however, that the ink jet print head chip 12 is suitable for connection to any micro processing apparatus that is capable of controlling, in a desired manner, a plurality of nozzle arrangements. In particular, since the nozzle arrangements 10 span the print medium, the nozzle arrangements 10 can be controlled in a digital manner. For example, a 1 can be assigned to an active nozzle arrangement 10 while a 0 can be assigned to a quiescent nozzle arrangement 10, in a dynamic manner.

In the following paragraphs, the manner of fabrication of the nozzle arrangement 10 is described, by way of example only. It will be appreciated that the following description is for purposes of enablement only and is not intended to limit the broad scope of the preceding summary or the invention as defined in the appended claims.

Figure 8:
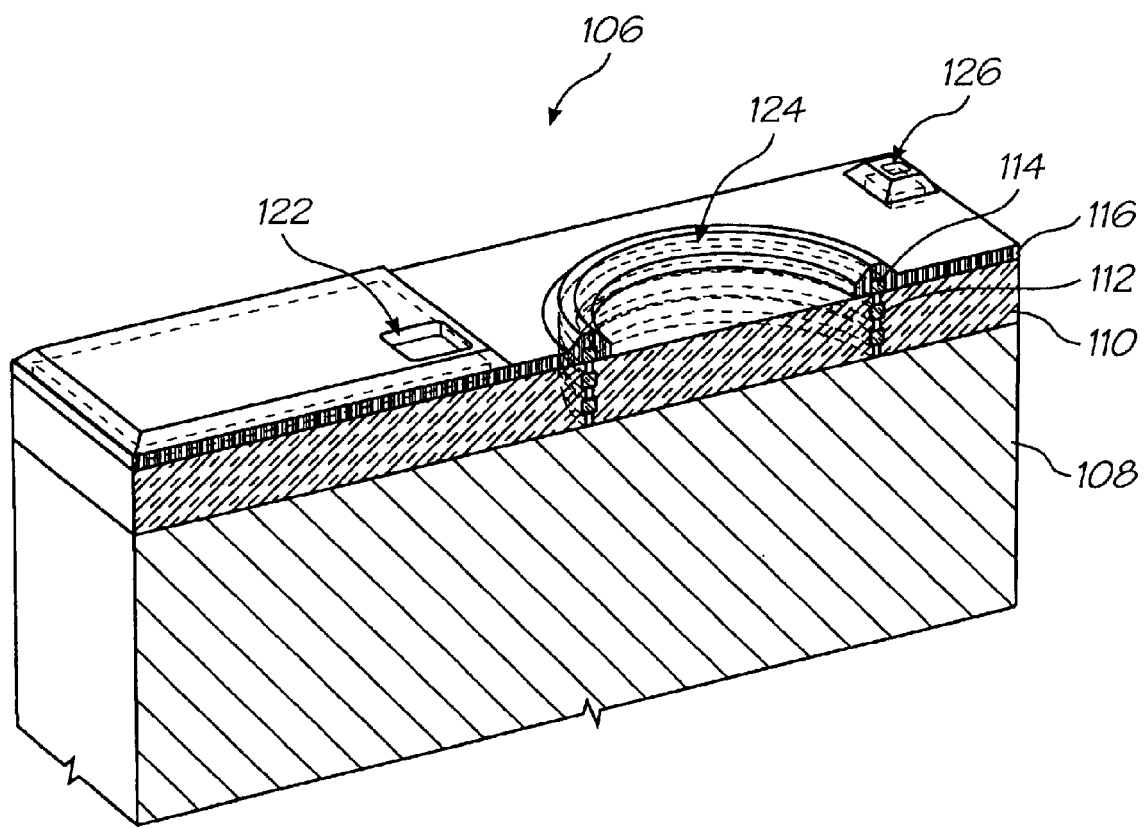
FIG. 8 shows a three-dimensional view through A—A in FIG. 10 of a wafer substrate, a drive circuitry layer, contact pads and an ink passivation layer for a starting stage in the fabrication of each nozzle arrangement of the printhead chip.
Figure 9:
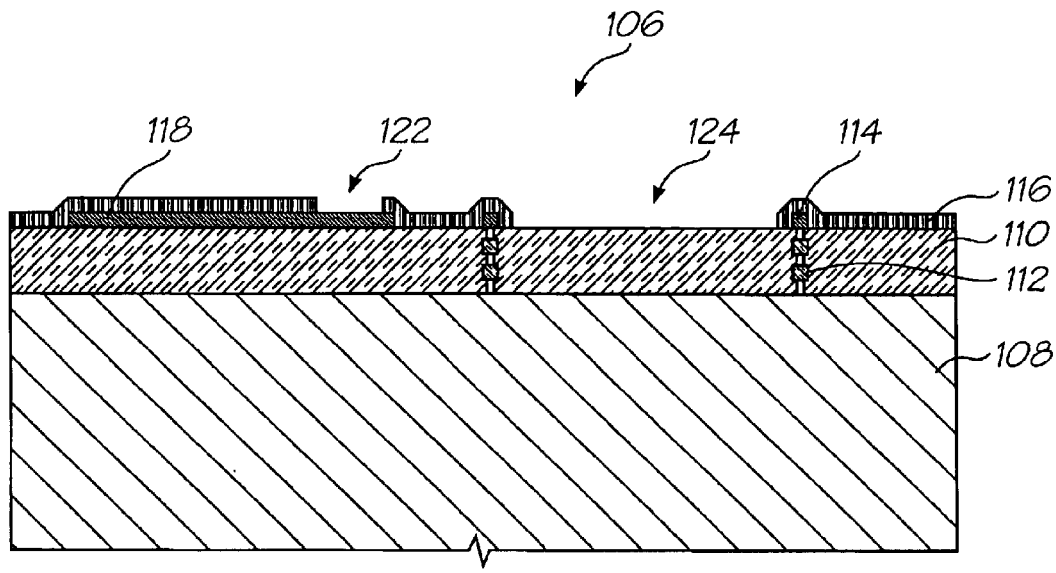
FIG. 9 shows a sectioned view through B—B in FIG. 10 of the stage of FIG. 8.

In FIGS. 8 and 9, reference numeral 106 generally indicates a complete 0.35 micron 1P4M 12 Volt CMOS wafer that is the starting stage for the fabrication of the nozzle arrangement 10. It is again emphasized that the following description of the fabrication of a single nozzle arrangement 10 is simply for the purposes of convenience. It will be appreciated that the processing techniques and the masks used are configured to carry out the fabrication process, as described below, on a plurality of such nozzle arrangements. However, for the purposes of convenience and ease of description, the fabrication of a single nozzle arrangement 10 is described. Thus, by simply extrapolating the following description, a description of the fabrication process for the ink jet print head chip 12 can be obtained.

The CMOS wafer 106 includes a silicon wafer substrate 108. A layer 110 of silicon dioxide is positioned on the wafer substrate 108 to form CMOS dielectric layers. Successive portions of CMOS metal 1, CMOS metal 2/3 and CMOS top level metal define an aluminum diffusion barrier 112. The diffusion barrier 112 is positioned in the layer 110 of silicon dioxide with a portion 114 of the barrier 112 extending from the layer 110. The barrier 112 serves to inhibit the diffusion of ions through the CMOS oxide layers of the layer 110. The CMOS top level metal defines a pair of aluminum electrode contacts 118 positioned on the layer 110.

A layer 116 of CMOS passivation material in the form of silicon nitride is positioned over the layer 110 of silicon dioxide, the portion 114 of the diffusion barrier 112 and the contacts 118. The silicon nitride layer 116 is deposited and subsequently patterned with a mask 120 in FIG. 10. The silicon nitride layer 116 is the result of the deposition of a resist on the silicon nitride, imaging with the mask 120 and subsequent etching to define a pair of contact openings 122, aligned across the wafer 108, an opening 124 for an ink inlet channel to be formed and test switch openings 126.

The silicon dioxide layer 110 has a thickness of approximately 5 microns. The layer 116 of silicon nitride has a thickness of approximately 1 micron.

Figure 10:
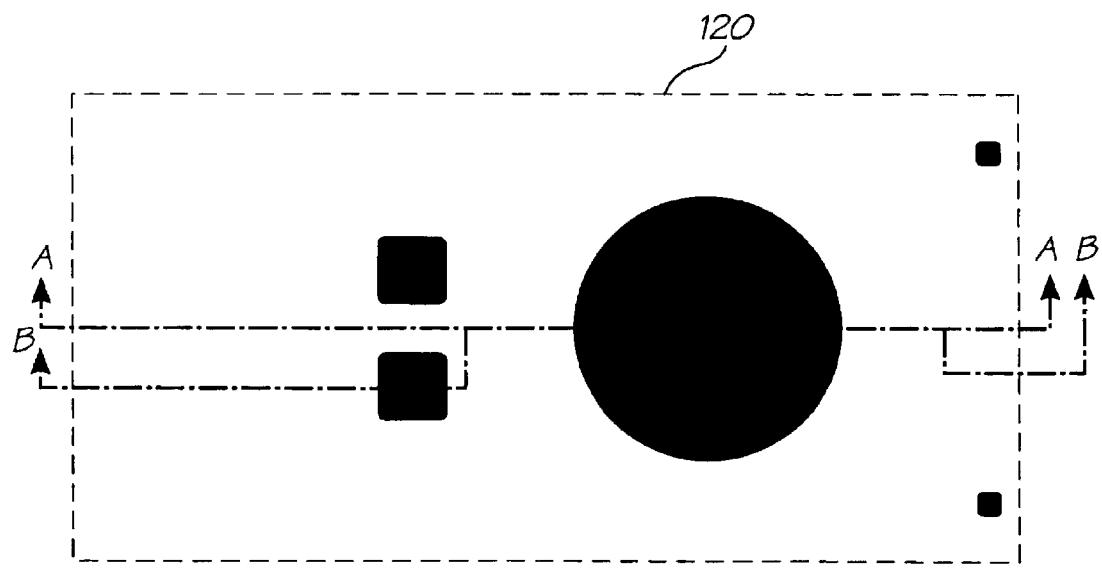
FIG. 10 shows a mask used for patterning the ink passivation (silicon nitride) layer.
Figure 11:
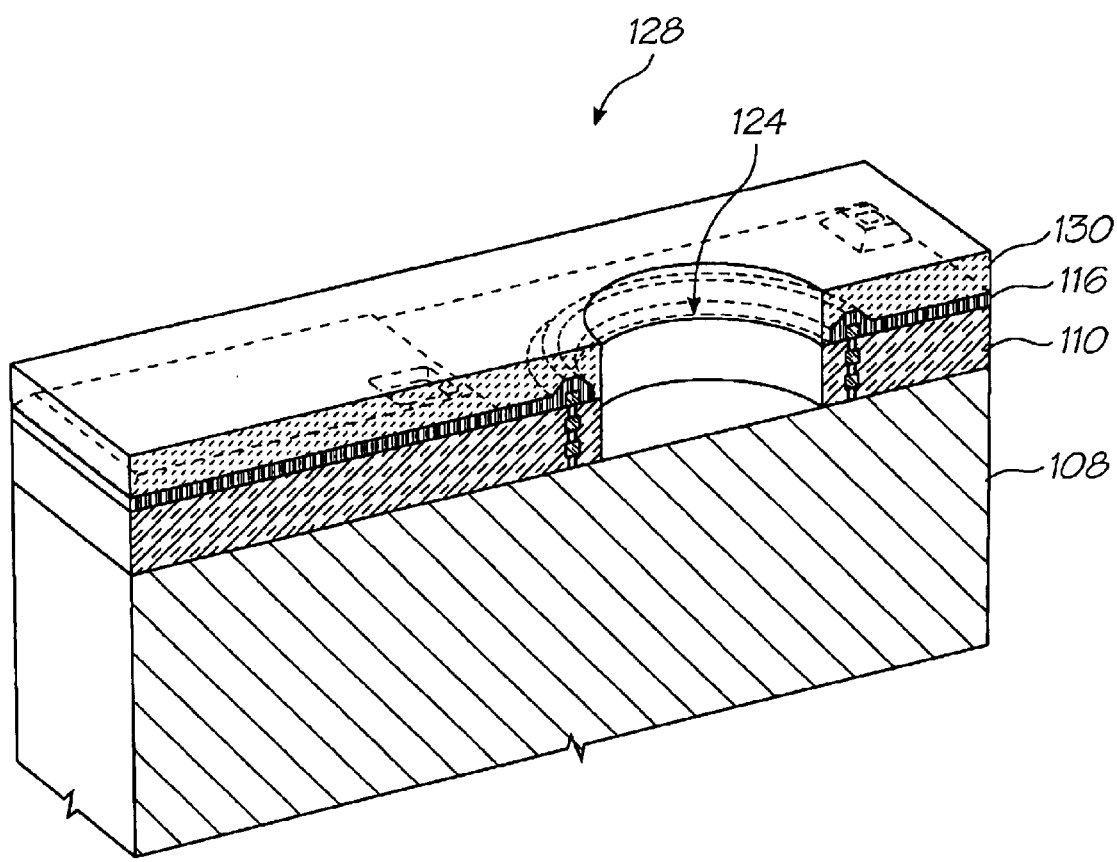
FIG. 11 shows a three-dimensional view through A—A in FIG. 13 of the stage of FIG. 8 with a resist layer deposited and patterned on the ink passivation layer.
Figure 12:
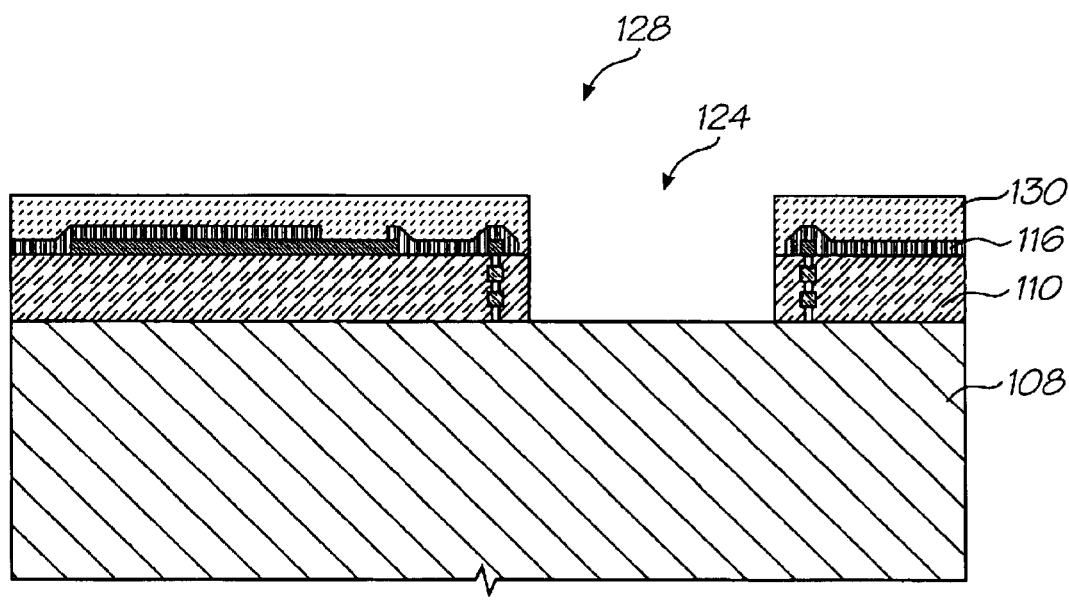
FIG. 12 shows a side sectioned view through B—B in FIG. 13 of the stage of FIG. 11.

In FIGS. 11 and 12, reference numeral 128 generally indicates a further fabrication step on the CMOS wafer 106. With reference to FIGS. 8 to 10, like reference numerals refer to like parts, unless otherwise specified.

The structure 130 shows the etching of the CMOS dielectric layers defined by the layer 110 of silicon dioxide down to bare silicon of the wafer 108.

Figure 13:
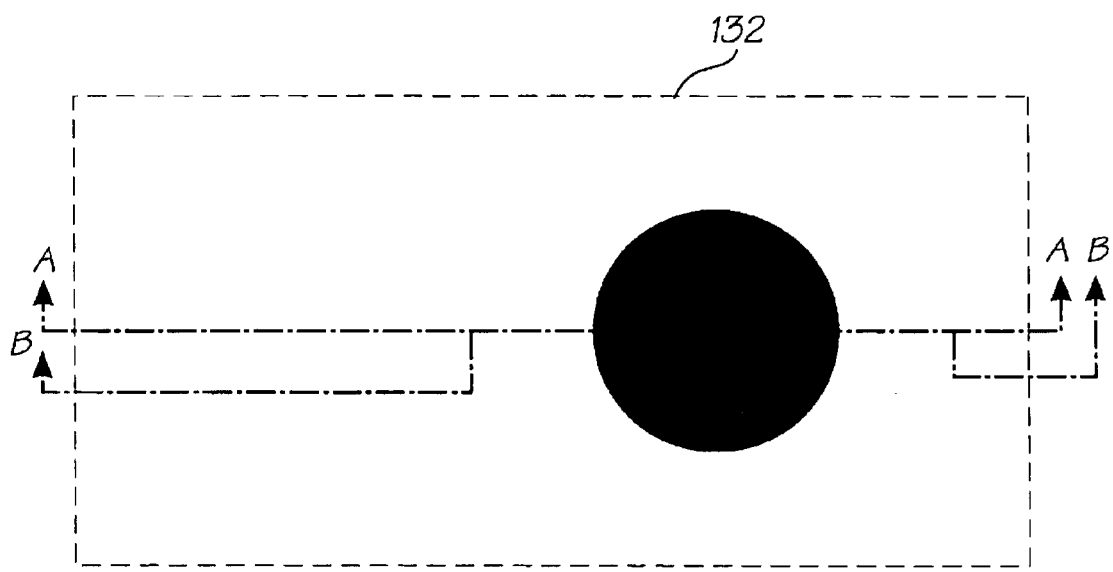
FIG. 13 shows a mask used for patterning the resist layer of FIG. 11.

Approximately 3 microns of resist material 130 is spun onto the silicon nitride layer 116. The resist material 130 is a positive resist material. A mask 132 in FIG. 13 is used for a photolithographic step carried out on the resist material 130. The photolithographic image that is indicated by the mask 132 is then developed and a soft bake process is carried out on the resist material 130.

The photolithographic step is carried out as a 1.0 micron or better stepping process with an alignment of +/−0.25 micron. An etch of approximately 4 microns is carried out on the silicon dioxide layer 110 down to the bare silicon of the silicon wafer 108.

Figure 14:
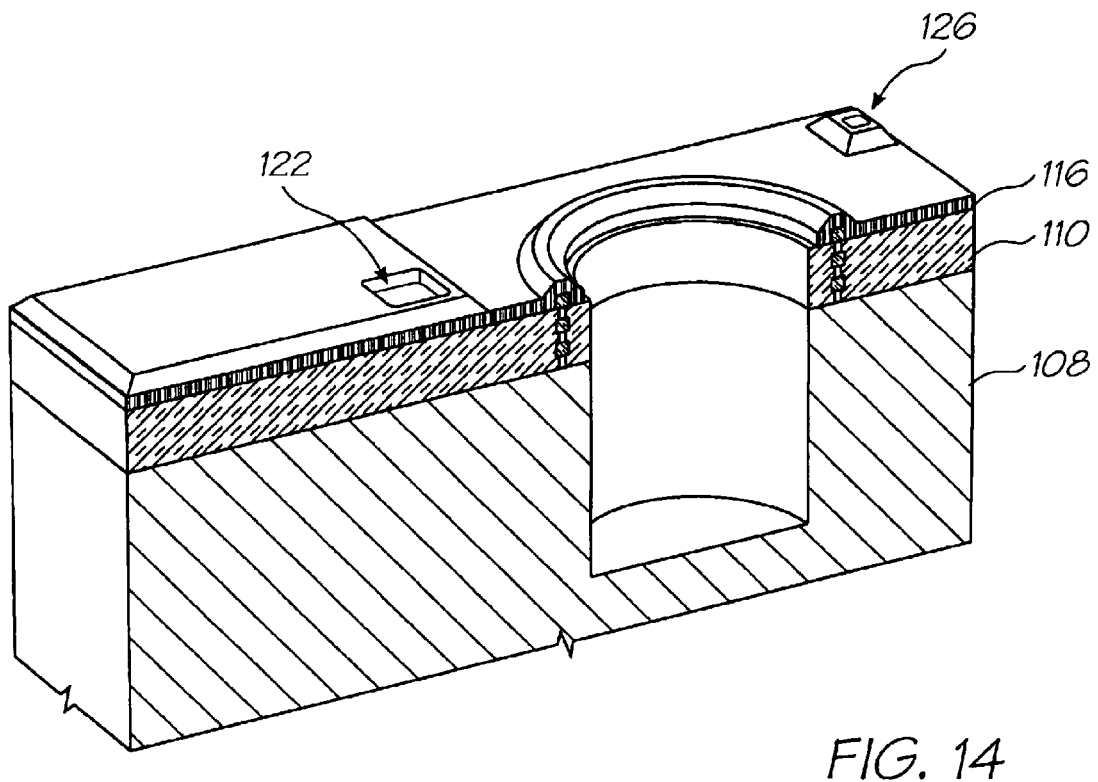
FIG. 14 shows a three-dimensional view sectioned view of the stage of FIG. 11, with the resist layer removed and the wafer substrate etched to a predetermined depth to define an ink inlet channel of the nozzle arrangement.
Figure 15:
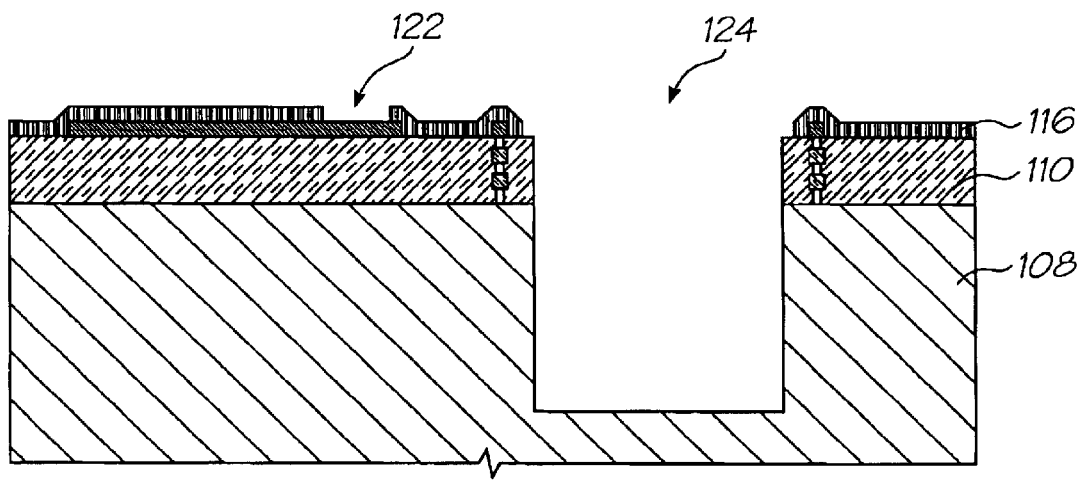
FIG. 15 shows a side sectioned view of the stage of FIG. 14.

In FIGS. 14 and 15, reference numeral 134 generally indicates the structure 128 after a deep reactive ion etch (DRIE) is carried out on the silicon wafer 108.

The etch is carried out on the bare silicon of the substrate 108 to develop the ink inlet channel 22 further. This is a DRIE to 20 microns (+10/−2 microns). Further in this step, the resist material 130 is stripped and the structure is cleaned with an oxygen plasma cleaning process.

The etch depth is not a critical issue in this stage. Further, the deep reactive ion etch can be in the form of a DRAM trench etch.

Figure 16:
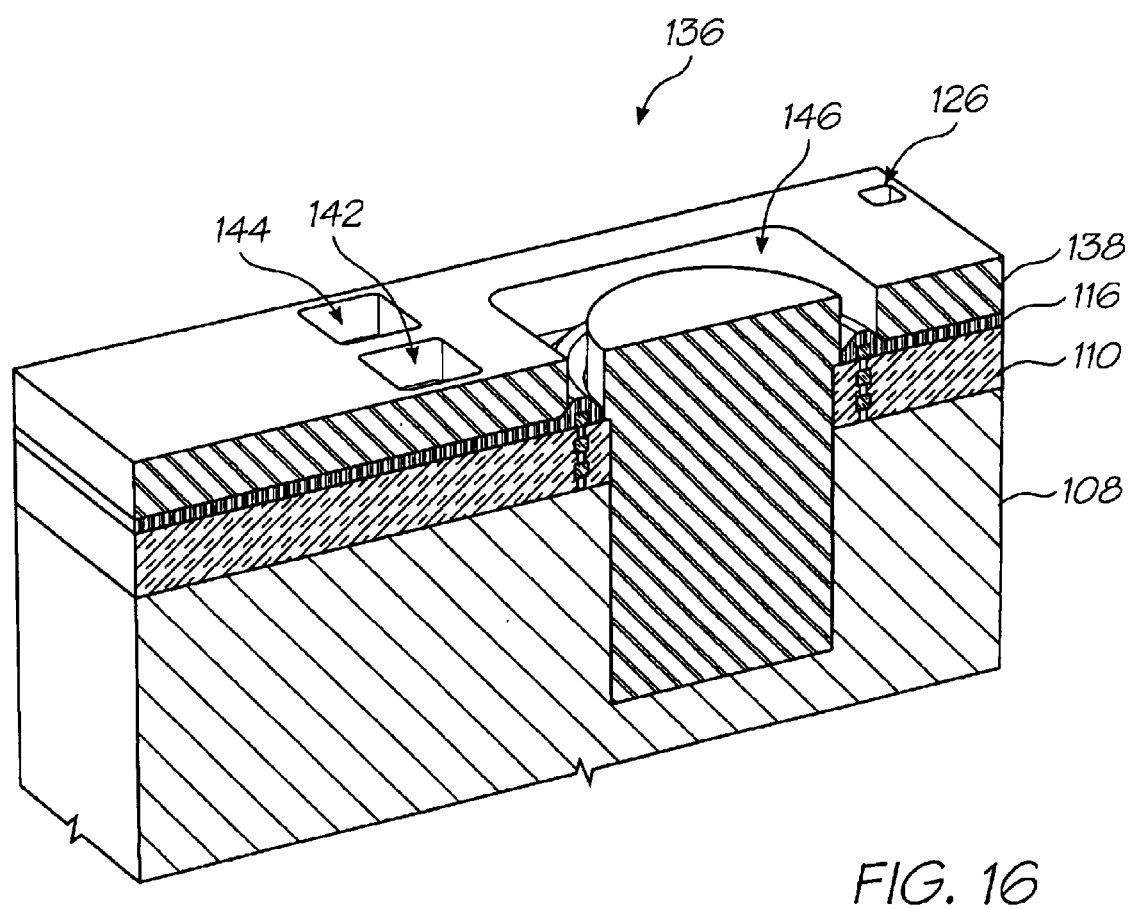
FIG. 16 shows a three-dimensional sectioned view through A—A in FIG. 18 of the stage of FIG. 14 with a first sacrificial layer deposited and patterned on the ink passivation layer.
Figure 17:
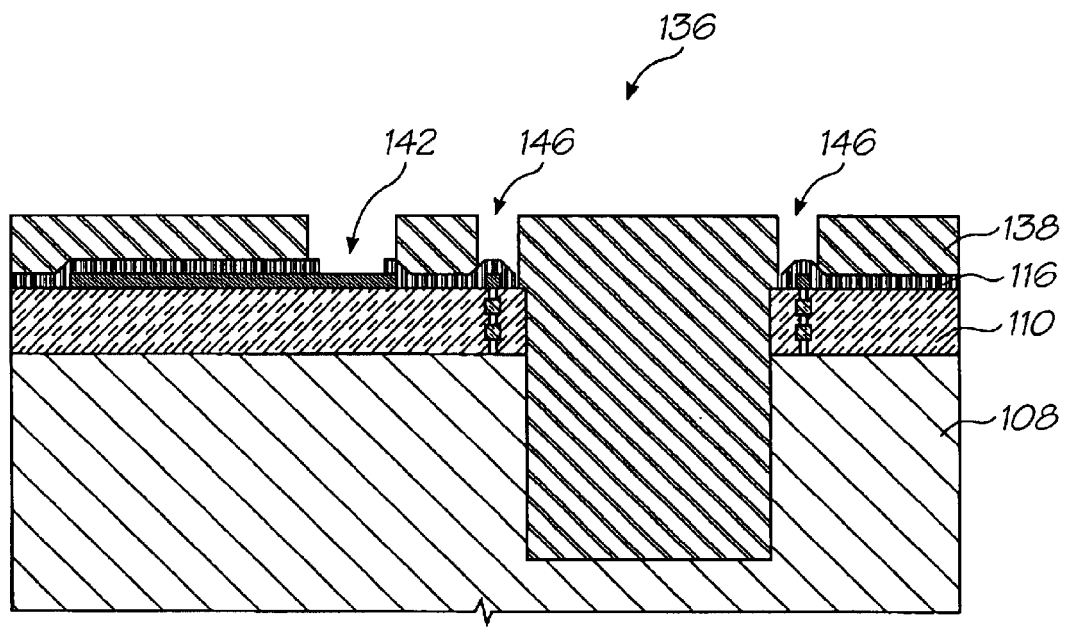
FIG. 17 shows a side sectioned view through B—B in FIG. 18 of the stage of FIG. 16.

In FIGS. 16 and 17, reference numeral 136 generally indicates the structure 134 with a first layer 138 of sacrificial resist material positioned thereon. With reference to the preceding Figures, like reference numerals refer to like parts, unless otherwise specified.

Figure 18:
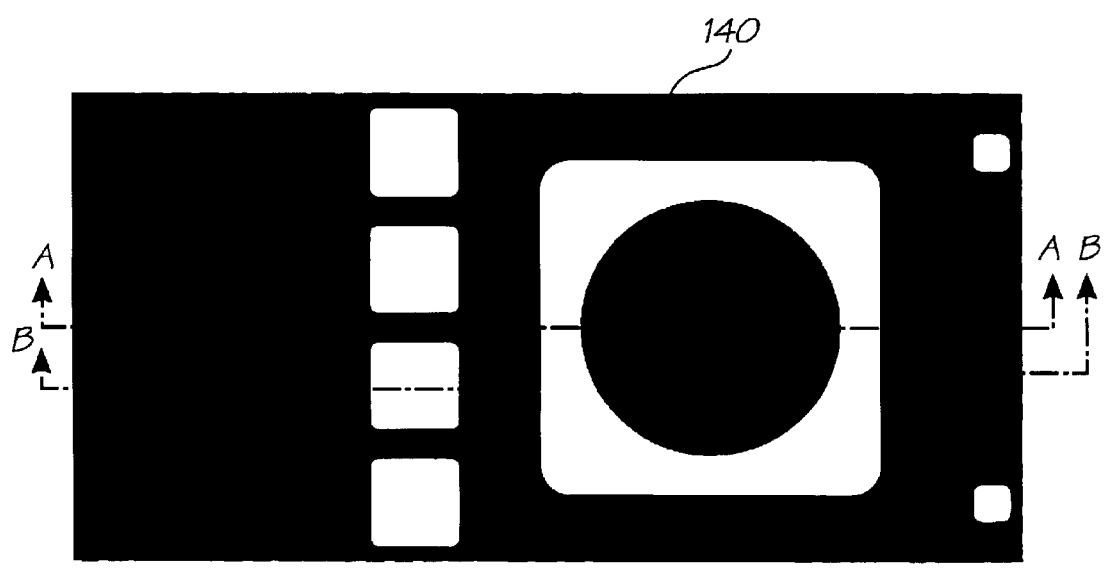
FIG. 18 shows a mask used for patterning the first sacrificial layer.

In this stage, approximately 3.5 microns of the sacrificial resist material 138 is spun on to the front surface of the structure 134. A mask 140 in FIG. 18 is used together with a photolithographic process to pattern the first layer 138 of the sacrificial material.

The photolithographic process is a 1.0 micron stepping process or better. The mask bias is +0.3 micron and the alignment is +/−0.25 micron.

The sacrificial material 138 is a positive resist material. The sacrificial material 138 can be in the form of a polyimide.

Being a positive resist, the first layer 138, when developed, defines a pair of contact openings 142 which provide access to the aluminum electrode contact layers 122 and a pair of openings 144. The openings 142 are positioned between the openings 144 so that the openings 142, 144 are aligned across the wafer 108. The openings 144 terminate at the layer 116 of silicon nitride. As can be seen in the drawings, a region that was previously etched into the silicon wafer substrate 108 and through the silicon dioxide layer 110 to initiate the ink inlet channel 22 is filled with the sacrificial material 138. A region 146 above the portion 114 of the diffusion barrier 112 and the layer 116 is cleared of sacrificial material to define a zone for the nozzle chamber 34. Still further, the sacrificial material 138 defines a pair of test switch openings 148.

The sacrificial material 138 is cured with deep ultraviolet radiation. This serves to stabilize the sacrificial material 138 to increase the resistance of the sacrificial material 138 to later etching processes. The sacrificial material 138 shrinks to a thickness of approximately 3 microns.

Figure 19:
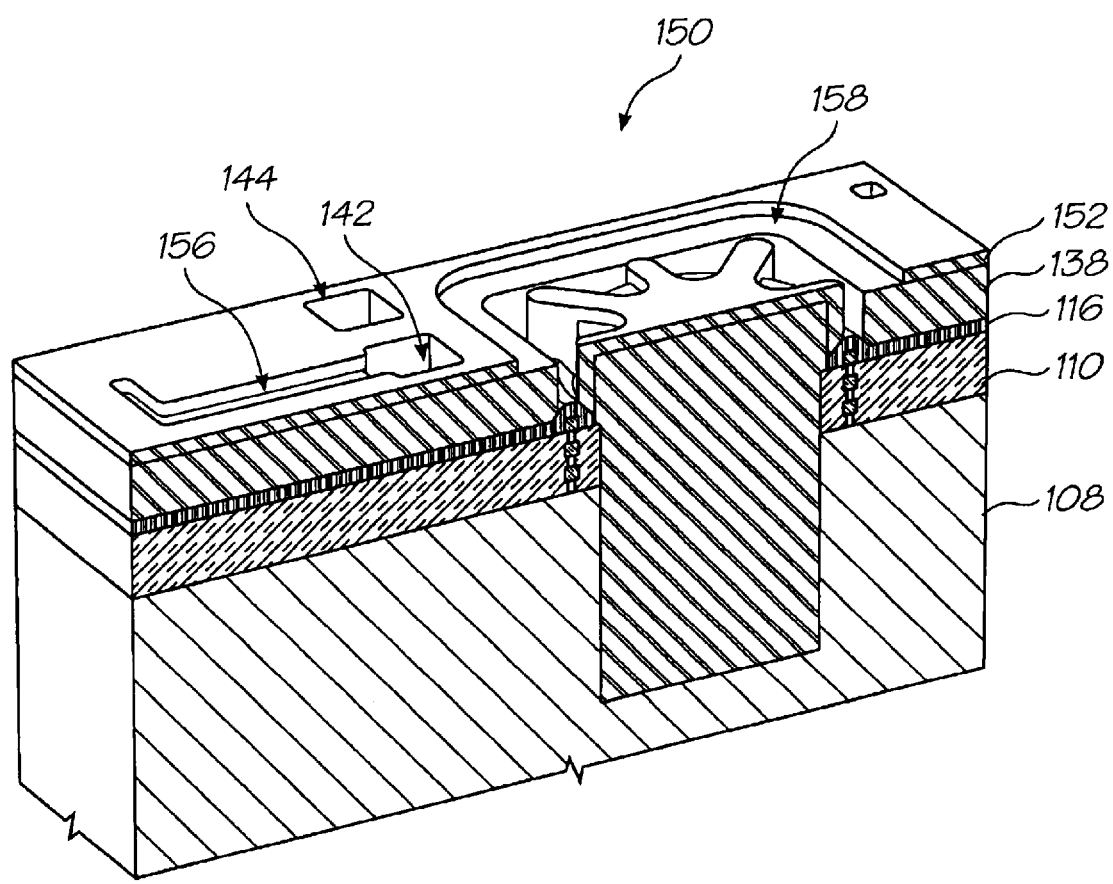
FIG. 19 shows a three-dimensional sectioned view through A—A in FIG. 21 of the stage of FIG. 16 with a second sacrificial layer deposited and patterned on the first sacrificial layer.
Figure 20:
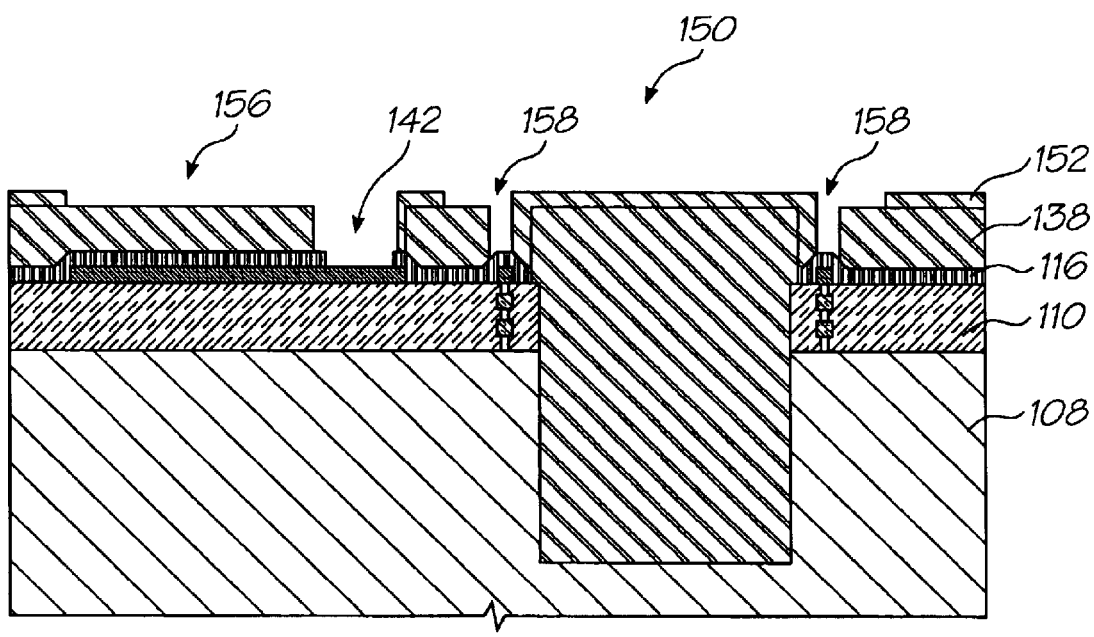
FIG. 20 shows a side sectioned view through B—B in FIG. 21 of the stage of FIG. 19.

In FIGS. 19 and 20, reference numeral 150 generally indicates the structure 136 with a second layer 152 of sacrificial resist material developed thereon. With reference to the preceding figures, like reference numerals refer to like parts, unless otherwise specified.

In this stage, approximately 1.2 microns of the sacrificial resist material 152 in the form of a positive resist material are spun onto the structure 136. The sacrificial material 152 can be in the form of a polyimide.

Figure 21:
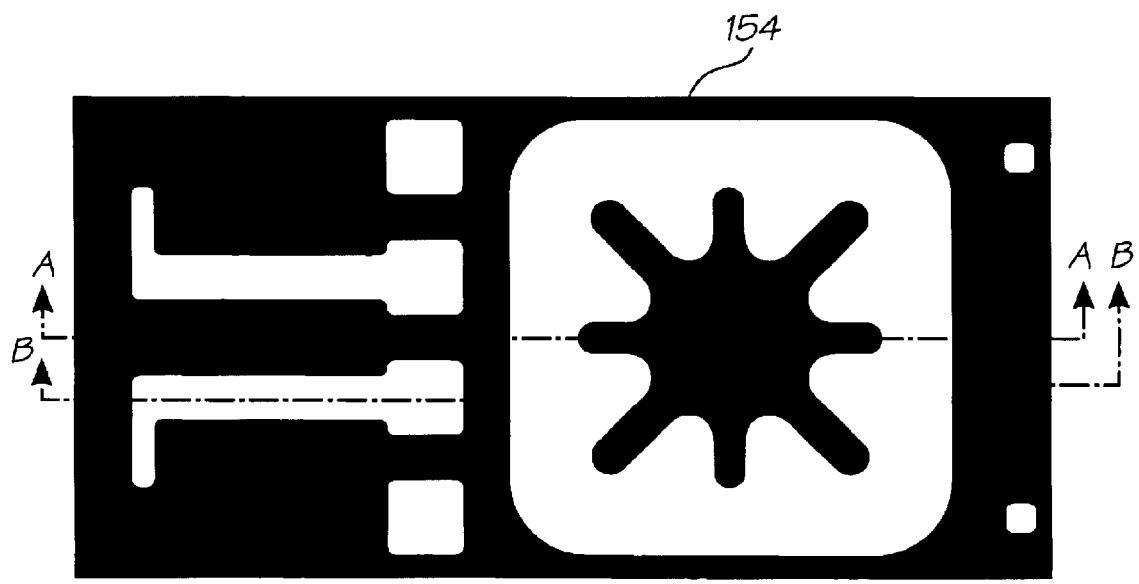
FIG. 21 shows a mask used for patterning the second sacrificial layer.

A mask 154 shown in FIG. 21 is used together with a photolithographic process to pattern the sacrificial material 152. The photolithographic process is a 1.0 micron stepper or better process. Further, the mask bias is +0.2 micron for top features only. The alignment during the photolithographic process is +/−0.25 micron.

It should be noted that, in the previous stage, a relatively deep hole was filled with resist. The sacrificial material 152 serves to fill in any edges of the deep hole if the sacrificial material 138 has shrunk from an edge of that hole.

Subsequent development of the sacrificial material 152 results in the structure shown in FIGS. 19 and 20. The openings 142, 144 are extended as a result of the mask 154. Further, deposition zones 156 are provided for the planar sections 80 of the inner actuator arms 72. It will also be apparent that a further deposition zone 158 is formed for the fixed part 36 of the nozzle chamber wall 30. It will thus be appreciated that the fixed part 36 is of titanium aluminum nitride. The mask 154 also provides for extension of the test switch openings 148.

Once developed, the sacrificial material 152 is cured with deep ultraviolet radiation. This causes the sacrificial material 152 to shrink to 1 micron.

Figure 22:
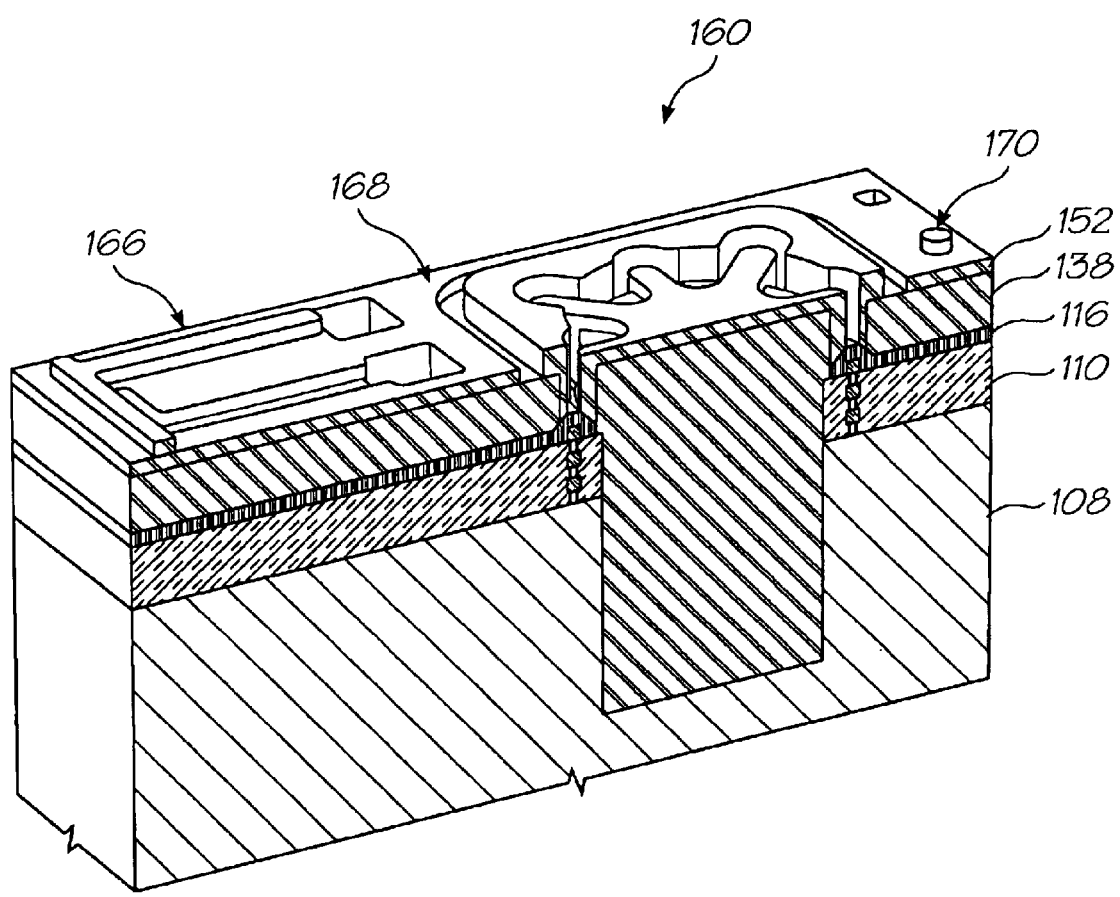
FIG. 22 shows a three-dimensional view through A—A in FIG. 24 of the stage of FIG. 19 after a selective etching of the second sacrificial layer.
Figure 23:
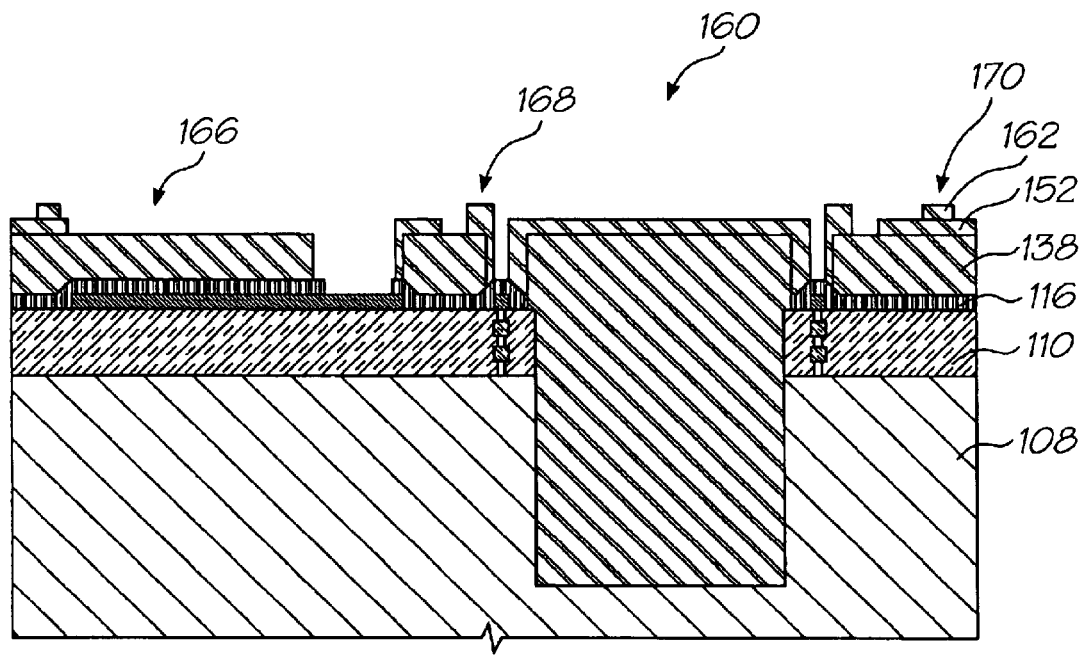
FIG. 23 shows a side sectioned view through B—B in FIG. 24 of the stage of FIG. 22.

In FIGS. 22 and 23, reference numeral 160 generally indicates the structure 150 with a third layer 162 of sacrificial resist material positioned thereon. With reference to the preceding figures, like reference numerals refer to like parts, unless otherwise specified.

At this stage, approximately 1.2 microns of the sacrificial material 162 are spun onto the structure 150. The sacrificial material 162 is a positive resist material. The sacrificial material 162 can be in the form of a polyimide.

Figure 24:
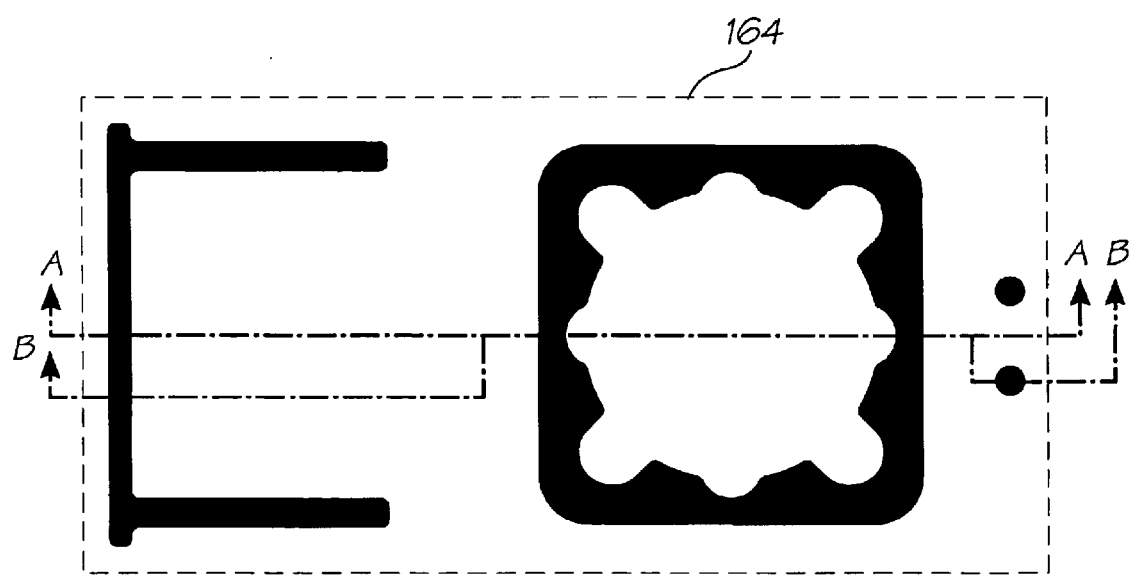
FIG. 24 shows a mask used for the selective etching of the second sacrificial layer.

A mask 164 in FIG. 24 is used to carry out a photolithographic imaging process on the sacrificial material 162.

The photolithographic process is a 1.0 micron stepper or better process. Further, the mask bias is +0.2 micron for the top features only. The alignment of the mask 164 is +/−0.25 micron.

Subsequent development of the sacrificial material 162 results in the structure 160 shown in FIG. 22 and FIG. 23.

During this step, the layers 138, 152 and 162 of sacrificial material are hard baked at 250 degrees Celsius for six hours in a controlled atmosphere. The sacrificial material 162 shrinks to 1.0 micron.

This step results in the formation of deposition zones 166 for the planar sections 82 of the outer actuator arms 74 and the bridge portion 76. This step also results in the formation of a deposition zone for the outwardly directed re-entrant portion 48 of the fixed part 36 of the nozzle chamber wall 30. Still further, deposition zones 170 for the contacts 100 for the test switch arrangement 98 are provided.

Figure 25:
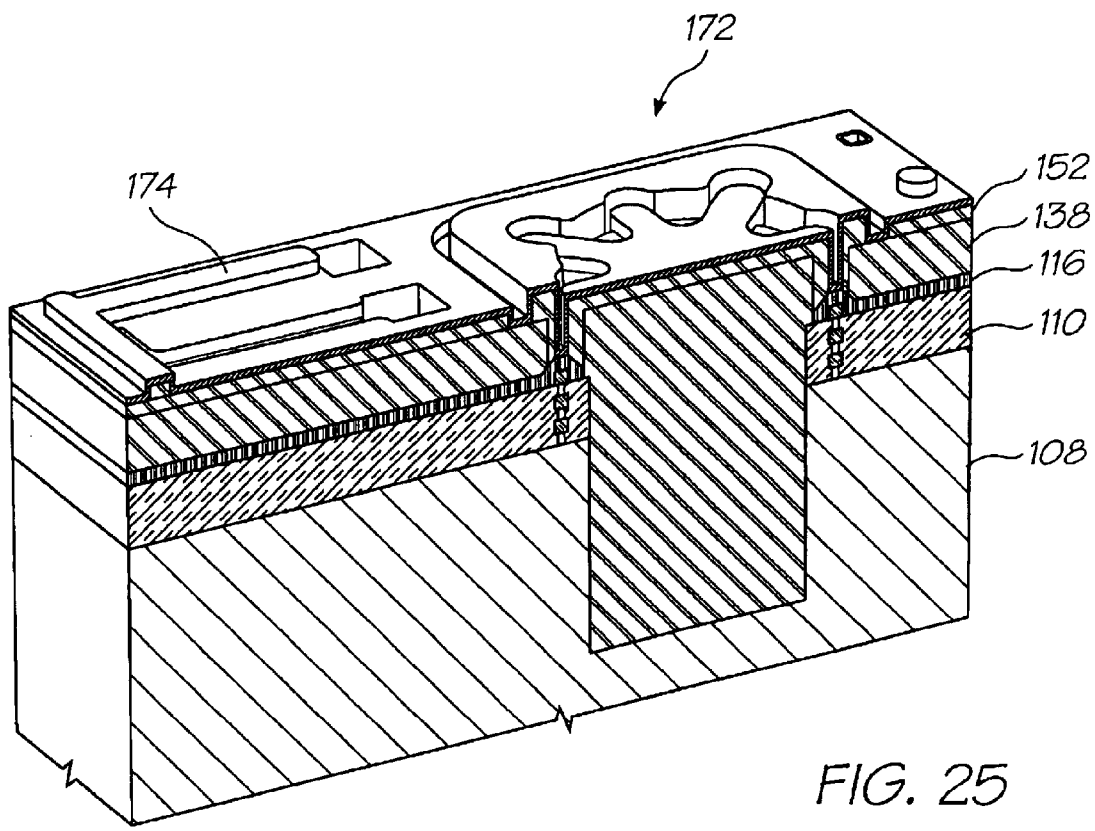
FIG. 25 shows a three-dimensional view of the stage of FIG. 21 with a conductive layer deposited on the second sacrificial layer.
Figure 26:
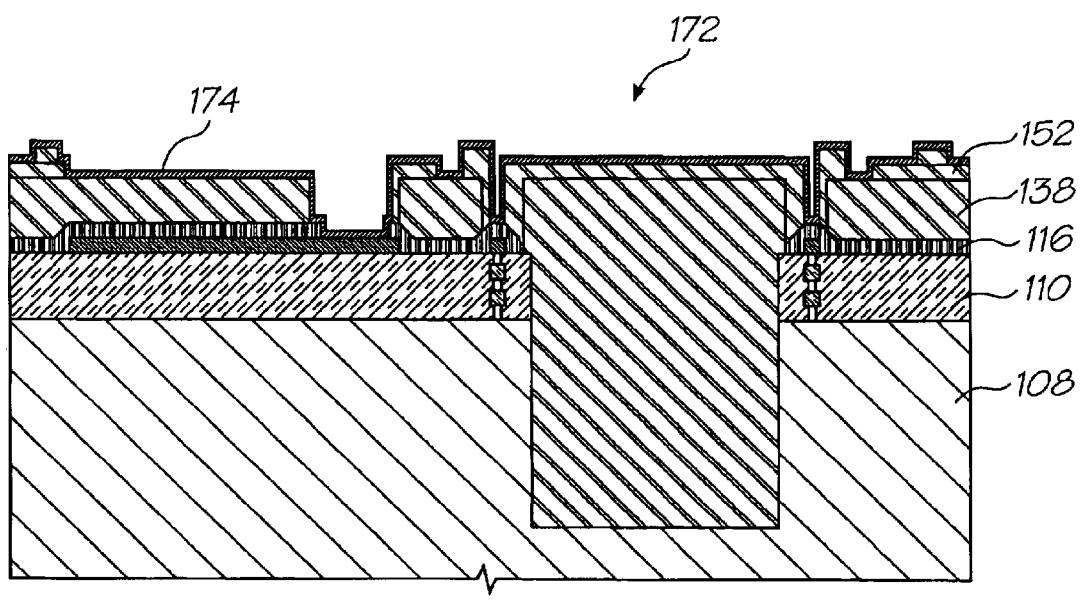
FIG. 26 shows a side sectioned view of the stage of FIG. 25.

In FIGS. 25 and 26, reference numeral 172 generally indicates the structure 160 with a layer of titanium aluminum nitride deposited thereon. With reference to the preceding figures, like reference numerals refer to like parts, unless otherwise specified.

In this stage, initially, approximately 50 Angstroms of titanium aluminum alloy at approximately 200 degrees Celsius are sputtered onto the structure 160 in an argon atmosphere. Thereafter, a nitrogen gas supply is provided and 5000 Angstroms of titanium aluminum is sputtered with the result that titanium aluminum nitride is deposited on the initial titanium aluminum metallic layer.

The initial titanium aluminum metallic layer is essential to inhibit the formation of nonconductive aluminum nitride at the resulting aluminum/titanium aluminum nitride interface.

The titanium aluminum is sputtered from a $Ti_{0.8}Al_{0.2}$ alloy target in a nitrogen atmosphere.

Titanium nitride can also be used for this step, although titanium aluminum nitride is the preferred material.

Possible new CMOS copper barrier materials such as titanium aluminum silicon nitride have potential due to their amorphous nanocomposite nature. In FIGS. 25 and 26 a layer of titanium aluminum nitride is indicated with reference numeral 174.

The deposition thickness can vary by up to 5 per cent.

Figure 27:
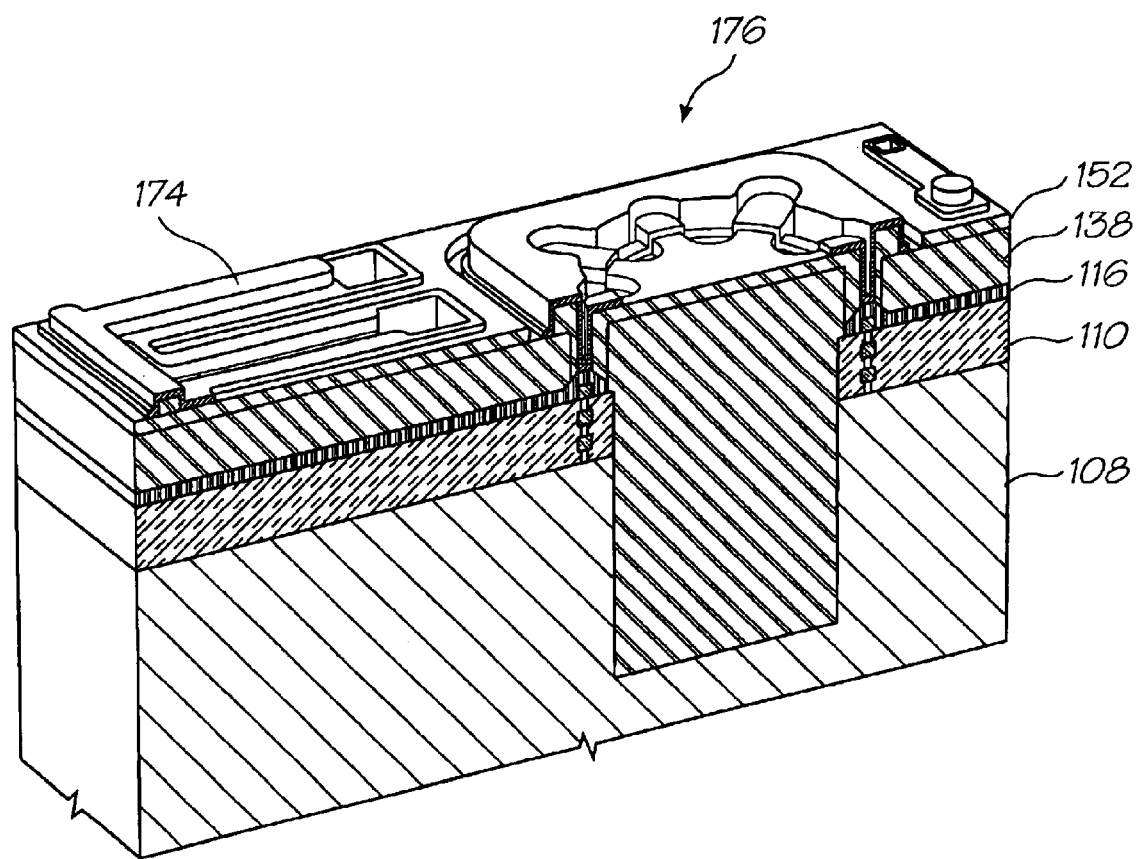
FIG. 27 shows a sectioned three-dimensional view through A—A in FIG. 29 of the stage of FIG. 25 with the conductive layer subjected to a selective etch.
Figure 28:
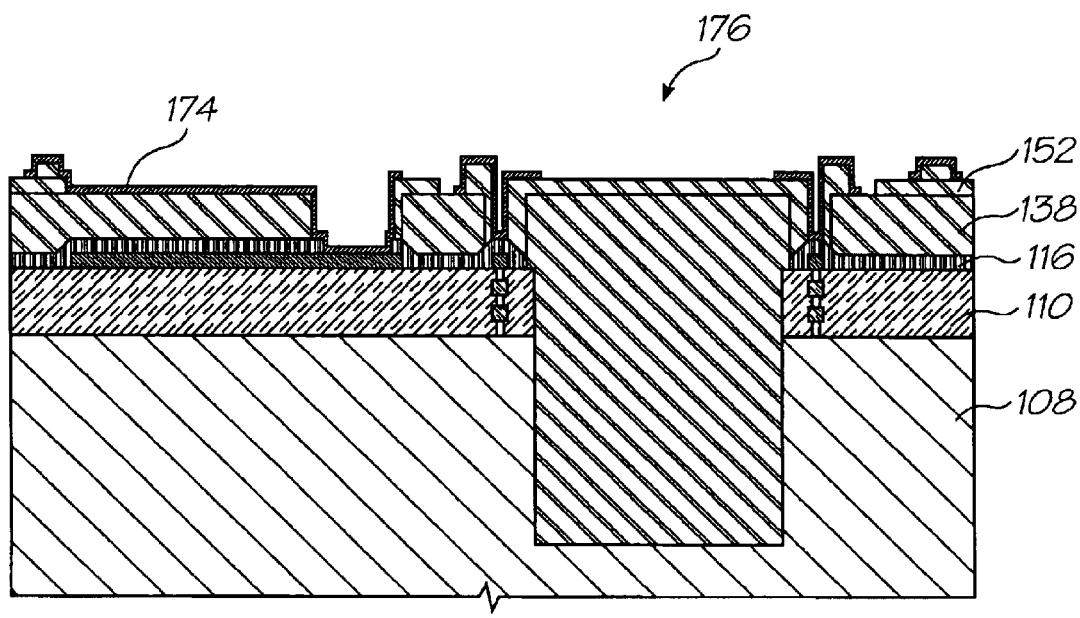
FIG. 28 shows a side sectioned view through B—B of the stage of FIG. 27.

In FIGS. 27 and 28, reference numeral 176 generally indicates the structure 172 with the titanium aluminum nitride layer 176 etched down to a preceding resist layer. With reference to the preceding figures, like reference numerals refer to like parts, unless otherwise specified.

At this stage, approximately 1 micron of a positive resist material is spun onto the layer 176.

Figure 29:
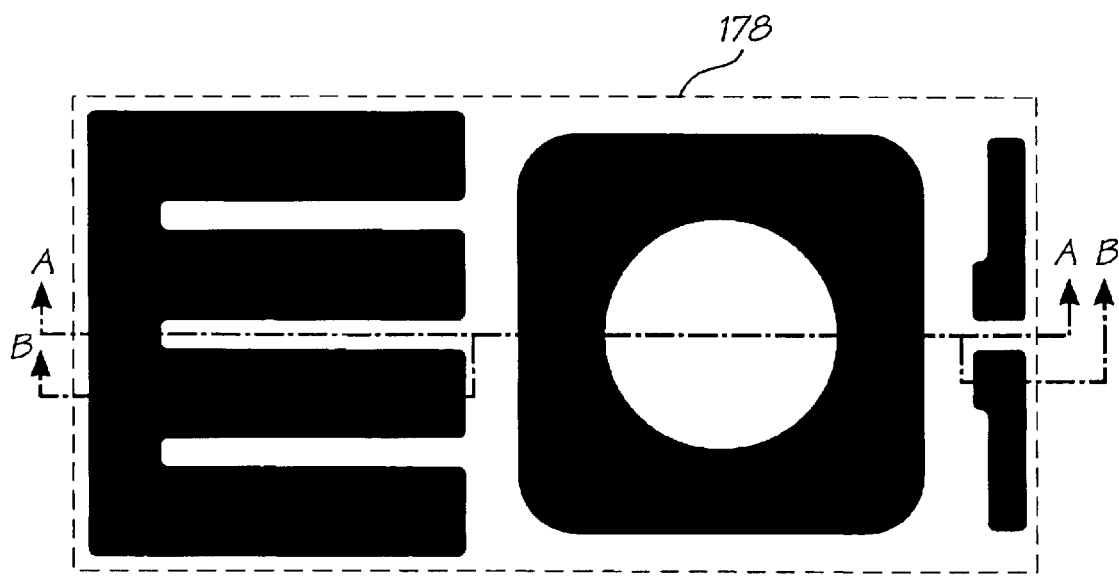
FIG. 29 shows a mask used for the etching of the conductive layer.

A mask 178 in FIG. 29 is used together with a photolithographic process to image the positive resist material. The resist material is then developed and undergoes a soft bake process.

The photolithographic process is a 0.5 micron or better stepper process. The mask bias is +0.2 micron for the top features only. The alignment of the mask 180 is +/−0.25 micron.

The titanium aluminum nitride layer 174 is etched to a depth of approximately 1.5 micron. A wet stripping process is then used to remove the resist. This ensures that the sacrificial material is not removed. A brief clean with oxygen plasma can also be carried out. This can remove sacrificial material so should be limited to 0.2 micron or less.

The result of this process is shown in FIGS. 27 and 28. As can be seen, this process forms the anchor portions 64 and the actuator arms 72, 74 together with the bridge portion 76 of the thermal actuator 60. Further, this process forms the fixed part 36 of the nozzle chamber wall 30. Still further, the result of this process is the formation of the test switch contacts 100.

Figure 30:
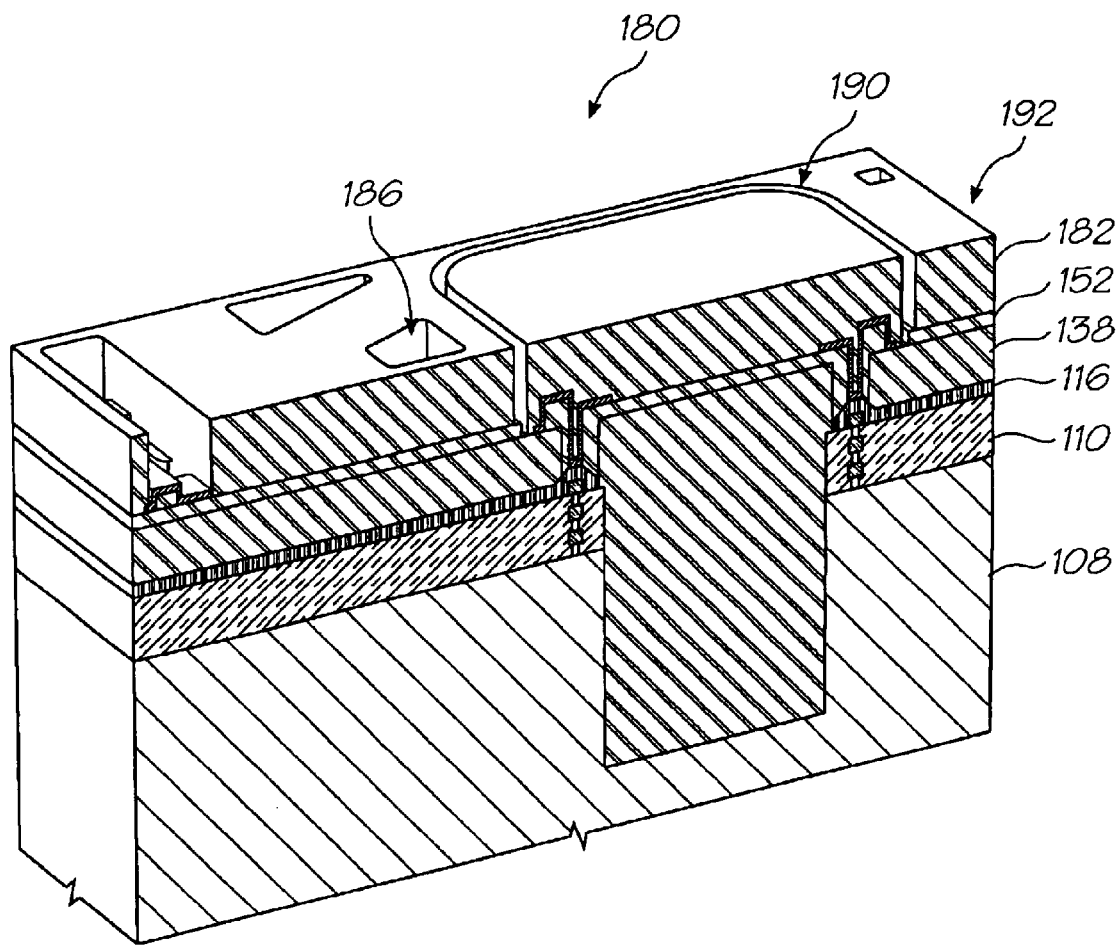
FIG. 30 shows a three-dimensional sectioned view through A—A in FIG. 32 with a third layer of sacrificial material deposited on the etched conductive layer.
Figure 31:
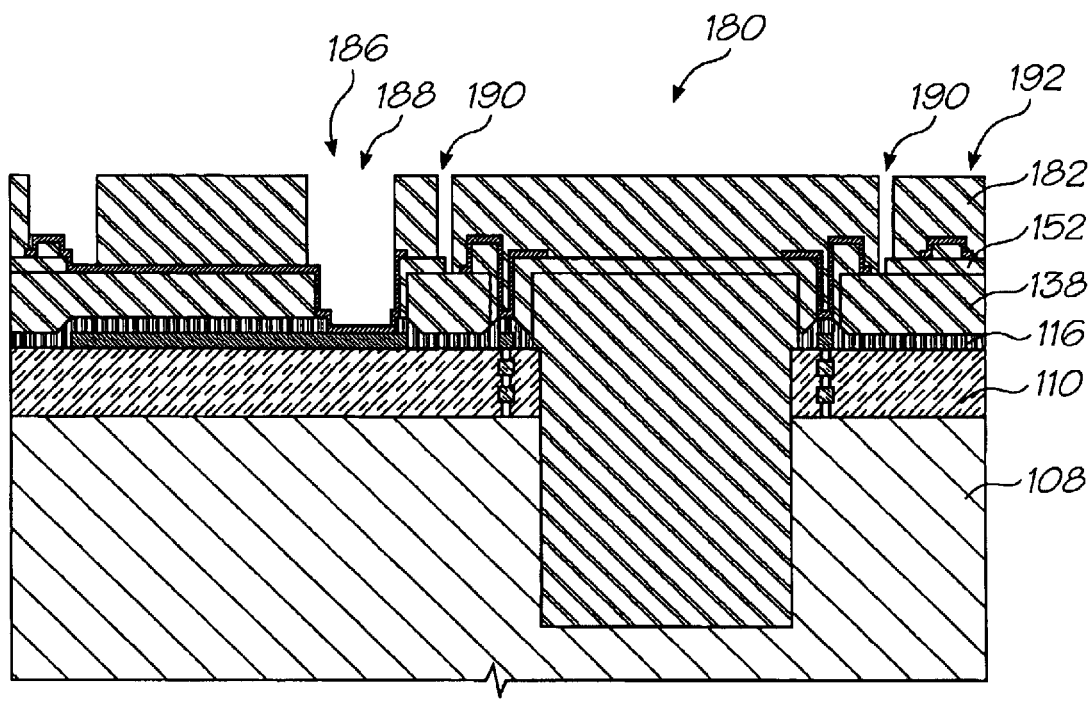
FIG. 31 shows a sectioned side view through B—B in FIG. 32 of the stage of FIG. 30.

In FIGS. 30 and 31, reference numeral 180 generally indicates the structure 176 with a fourth layer 182 of sacrificial resist material positioned on the structure 176. With reference to the preceding figures, like reference numerals refer to like parts, unless otherwise specified.

In this step, approximately 4.7 microns (+/−0.25 microns) of the sacrificial material 182 is spun onto the structure 176.

Figure 32:
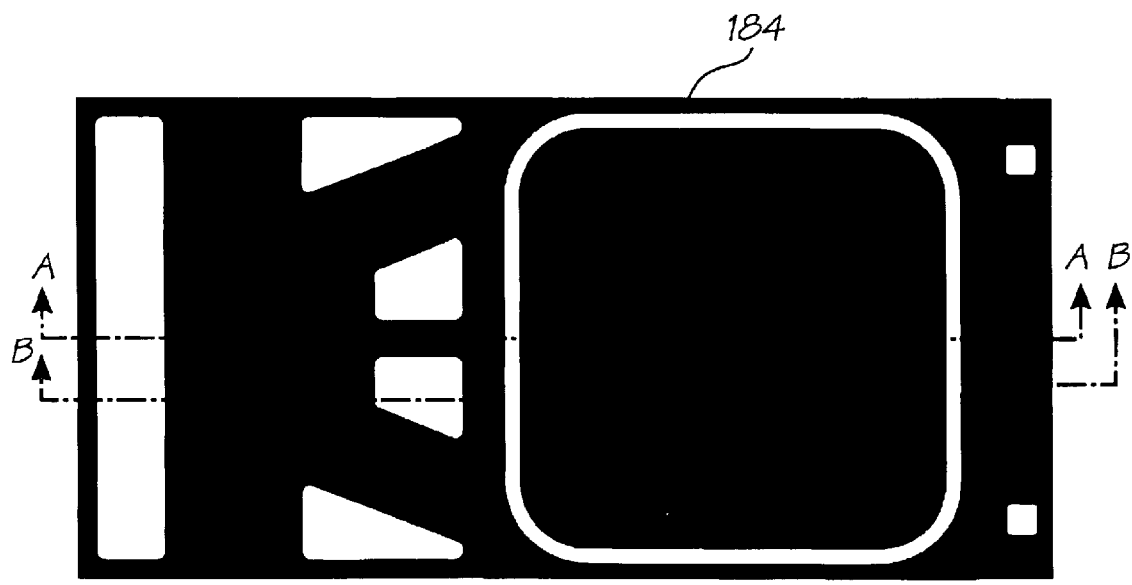
FIG. 32 shows a mask used for the deposition of the third sacrificial layer.

A mask 184 shown in FIG. 32 is then used together with a photolithographic process to generate an image on the sacrificial material 182. The sacrificial material 182 is a positive resist material and the image generated can be deduced from the mask 184.

The photolithographic process is a 0.5 micron stepper or better process. The mask bias is +0.2 microns. The alignment is +/−0.15 microns.

The image is then developed to provide the structure as can be seen in FIGS. 30 and 31. As can be seen in these drawings, the development of the sacrificial material 182 provides deposition zones 186 for a titanium layer that defines the titanium layer 68 of the vias 66 and which serves to fix the anchor portions 64 of the thermal actuator 60 to the silicon nitride layer 26. The sacrificial material 182 also defines a deposition zone 188 for the titanium layer 68 of the fulcrum formation 92. Still further, the sacrificial material 182 defines a deposition zone 190 for titanium of the movable part 38 of the nozzle chamber wall 30. Still further, the sacrificial material 182 defines deposition zones 192 for the test switch arrangement 98.

Once the sacrificial material 182 has been developed, the material 182 is cured with deep ultraviolet radiation. Thereafter, the sacrificial material 182 is hard baked at approximately 250 degrees Celsius in a controlled atmosphere for six hours. The resist material 182 subsequently shrinks to approximately 4 microns in thickness.

Figure 33:
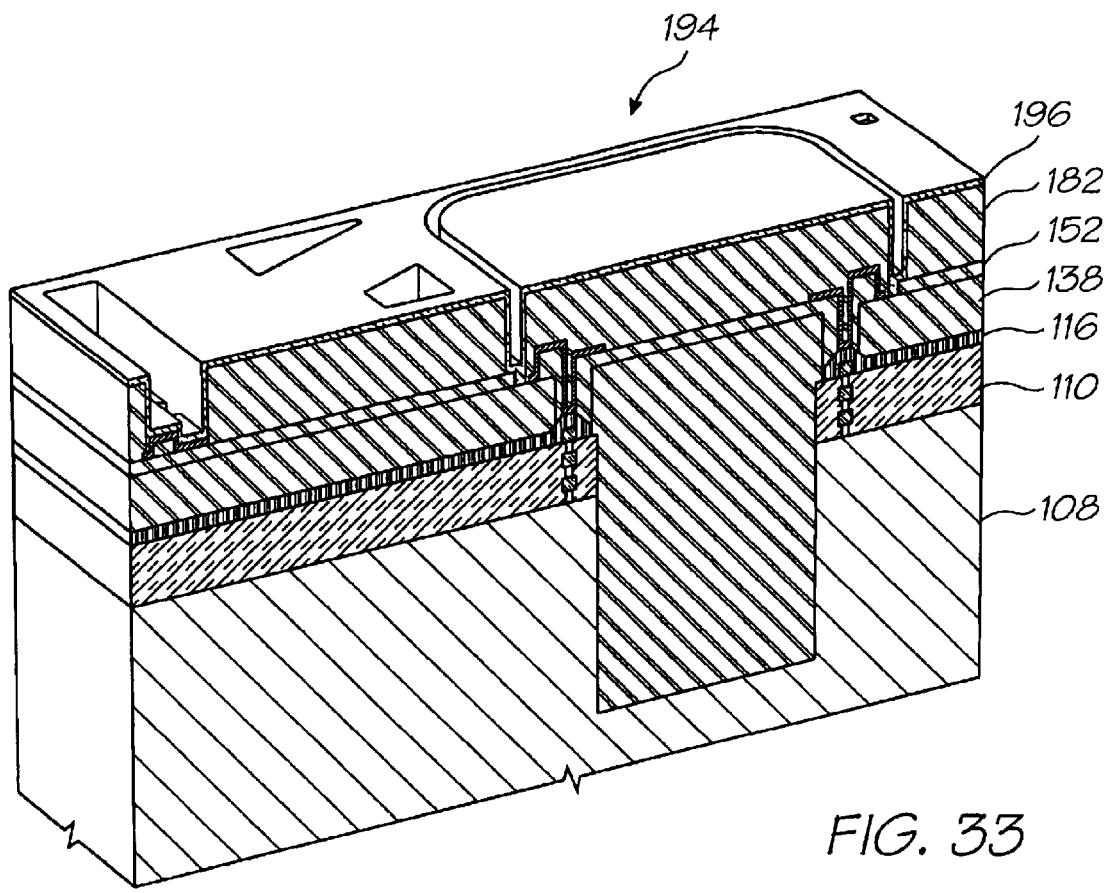
FIG. 33 shows a three-dimensional view of the stage of FIG. 28 with a layer of titanium deposited on the third layer of sacrificial material.
Figure 34:
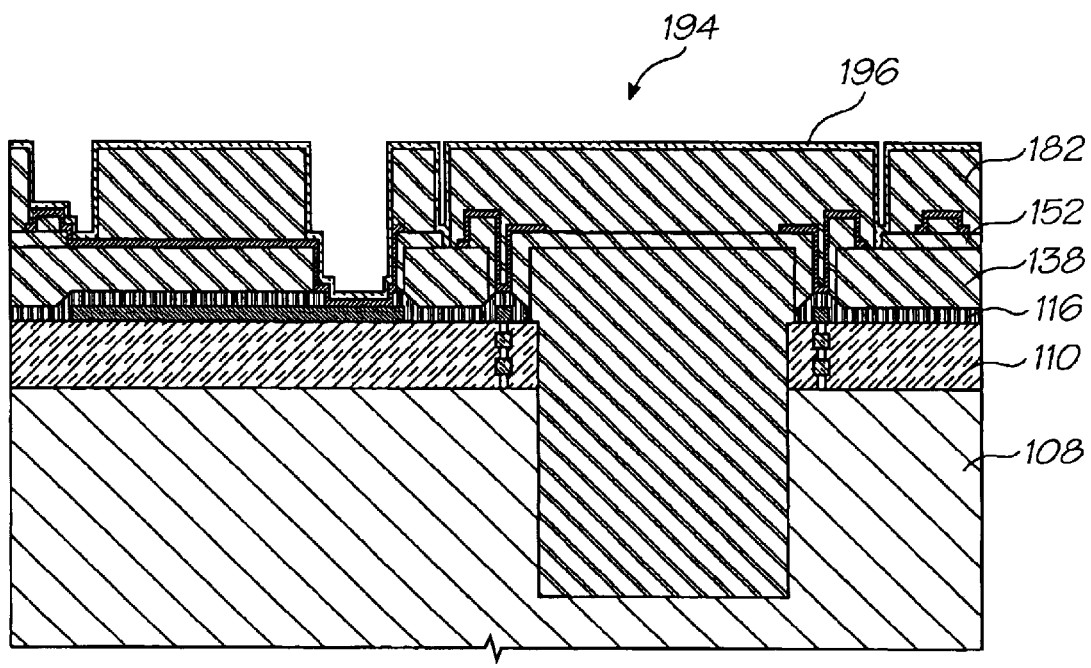
FIG. 34 shows a side sectioned view of the stage of FIG. 33.

In FIGS. 33 and 34, reference numeral 194 generally indicates the structure 180 with a layer 196 of titanium deposited thereon.

At this stage, approximately 0.5 micron of titanium is sputtered on to the structure 180 at approximately 200 degrees Celsius in an argon atmosphere.

It is important to note that the mechanical properties of this layer are not important. Instead of titanium, the material can be almost any inert malleable metal that is preferably highly conductive. Platinum or gold can be used in conjunction with a lift-off process. However, the use of gold will prevent subsequent steps being performed in the CMOS fabrication. Ruthenium should not be used as it oxidizes in subsequent oxygen plasma etch processes which are used for the removal of sacrificial materials.

The deposition thickness can vary by 30% from 0.5 micron and remain adequate. A deposition thickness of 0.25 micron should be achieved in any holes.

Figure 35:
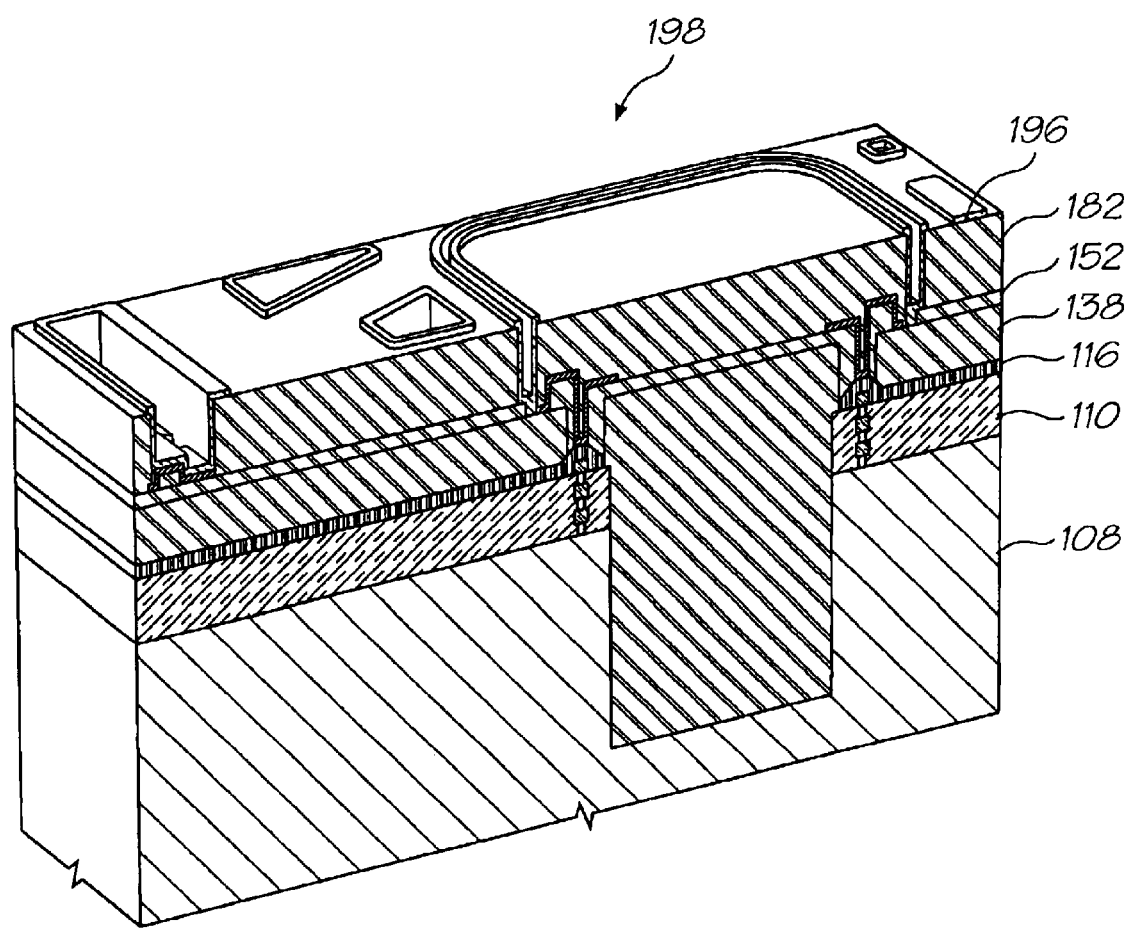
FIG. 35 shows a three-dimensional sectioned view taken through A—A in FIG. 37 of the layer of titanium subjected to an etch.
Figure 36:
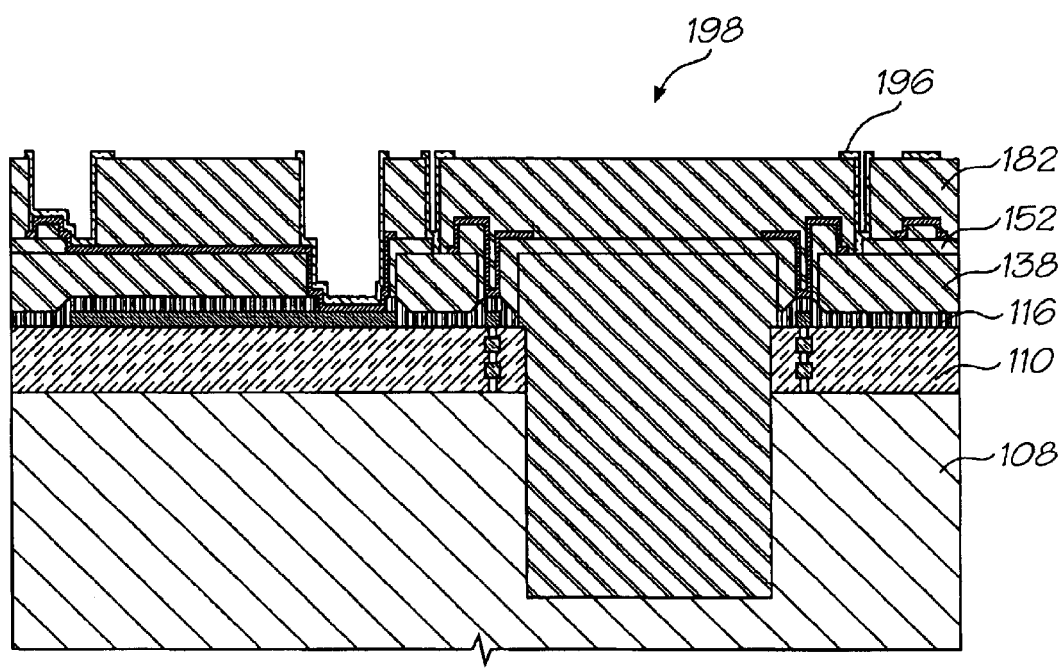
FIG. 36 shows a side sectioned view through B—B in FIG. 37 of the stage of FIG. 35.

In FIGS. 35 and 36, reference numeral 198 generally indicates the structure 194 with the layer 196 of titanium etched down to the sacrificial layer 182.

Figure 37:
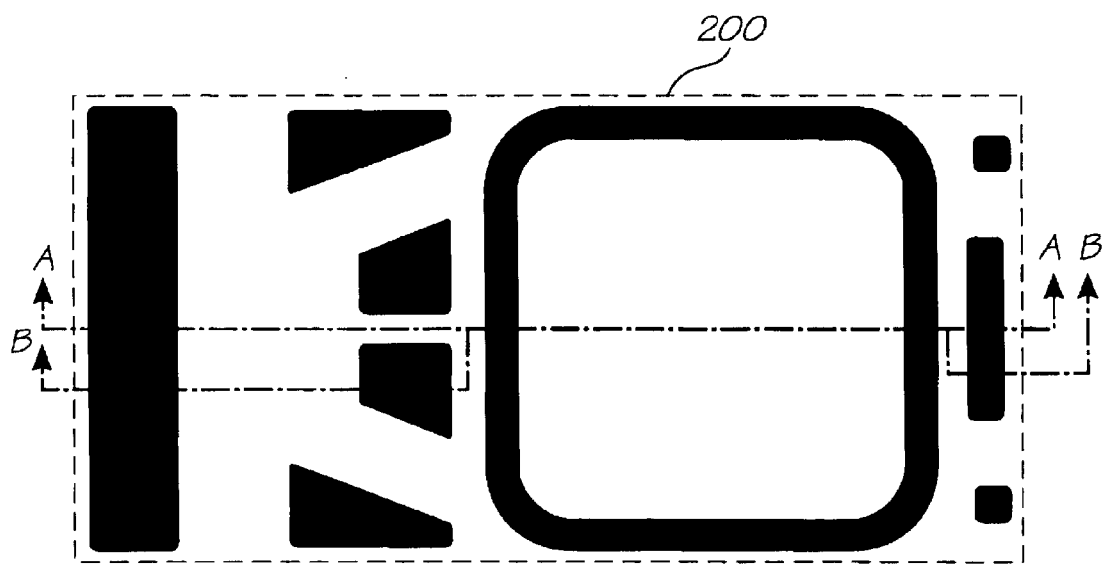
FIG. 37 shows a mask used for etching the layer of titanium.

At this stage, approximately 1 micron of resist material is spun on to the layer 196. A mask 200 shown in FIG. 37 is then used together with a photolithographic process to form an image on the layer 196.

The resist material is a positive resist material. It follows that the image can be deduced from the mask 200. It should be noted that all vertical geometry is masked. It follows that there are no etches of sidewalls.

The photolithographic process is a 1.0 micron stepper process or better. Further, the mask bias is +0.3 micron and the alignment of the mask is +/−0.25 micron.

The resist material is developed and undergoes a soft bake process. The titanium layer 196 is etched down to the preceding sacrificial layer 182. The sacrificial layer 182 was hard baked. This hard baking process inhibits the sacrificial layer 182 from being etched together with the titanium layer 196.

The etching process is planar and the lithographic process is therefore not critical.

The resist material is then removed with a wet stripping process. This ensures that the sacrificial material is not also removed. Thereafter, the front side of the structure is cleaned in oxygen plasma, if necessary. It should be noted that oxygen plasma cleaning would strip the resist material. It follows that the oxygen plasma stripping or cleaning should be limited to 0.2 micron or less.

The result of this process can clearly be seen in FIGS. 34 and 35. In particular, the deposition zones 186, 188, 190, 192 are now each covered with a layer of titanium.

Figure 38:
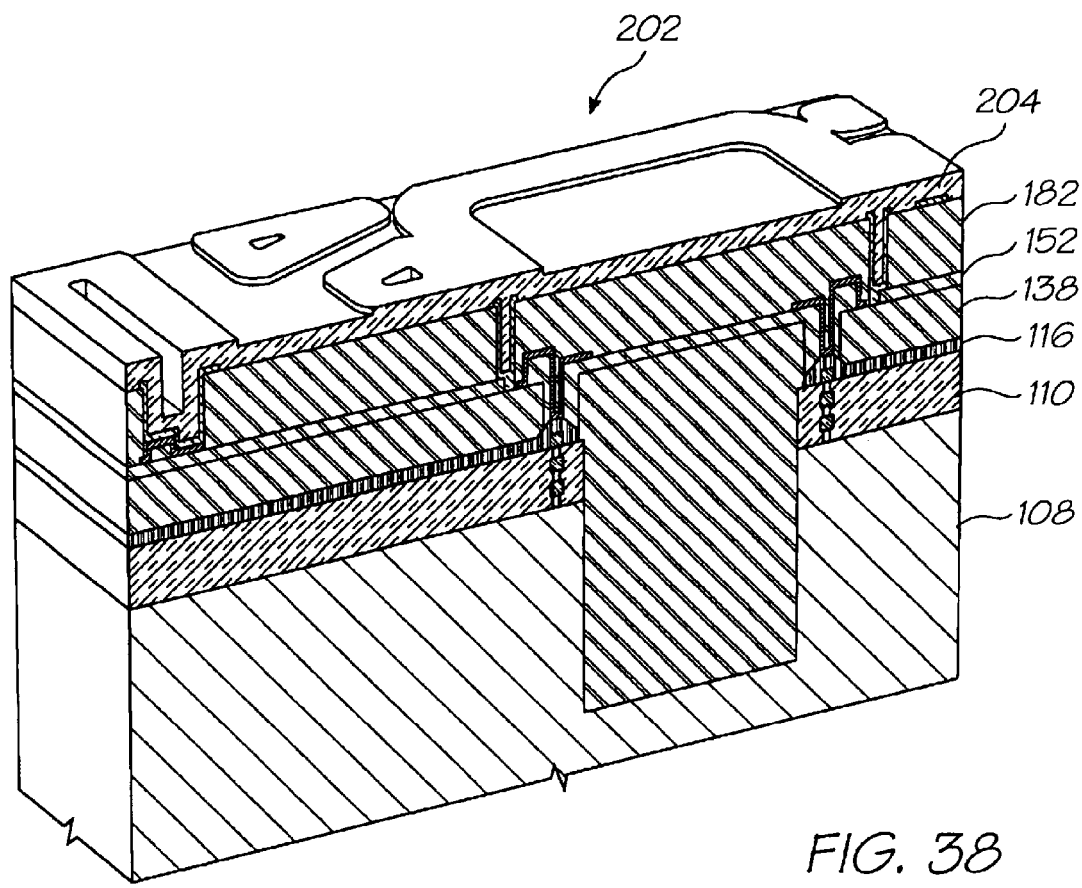
FIG. 38 shows a three-dimensional view of the stage of FIG. 35 with a layer of dielectric material deposited on the etched layer of titanium.
Figure 39:
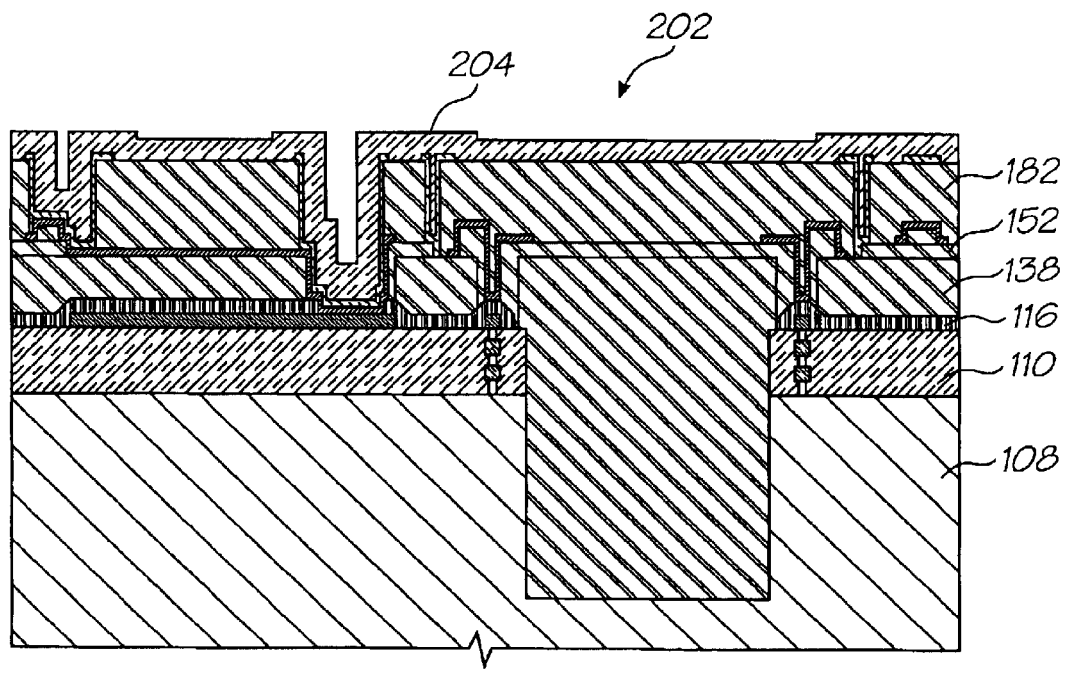
FIG. 39 shows a side sectioned view of the stage of FIG. 38.

In FIGS. 38 and 39, reference numeral 202 generally indicates the structure 198 with a layer 204 of low temperature silicon nitride deposited thereon. With reference to the preceding figures, like reference numerals refer to like parts, unless otherwise specified.

At this stage, the layer 204 of low temperature silicon nitride having a thickness of approximately 1.5 microns is deposited through ICP chemical vapor deposition (CVD) on the structure 198 at approximately 200 degrees Celsius.

Any suitably strong, chemically inert dielectric material could be used instead. The material properties of this layer are not especially important. The silicon nitride does not need to be densified. It follows that high temperature deposition and annealing are not required. Furthermore, this deposition process should be approximately conformal but this is not particularly critical. Still further, any keyholes that may occur are acceptable.

Figure 40:
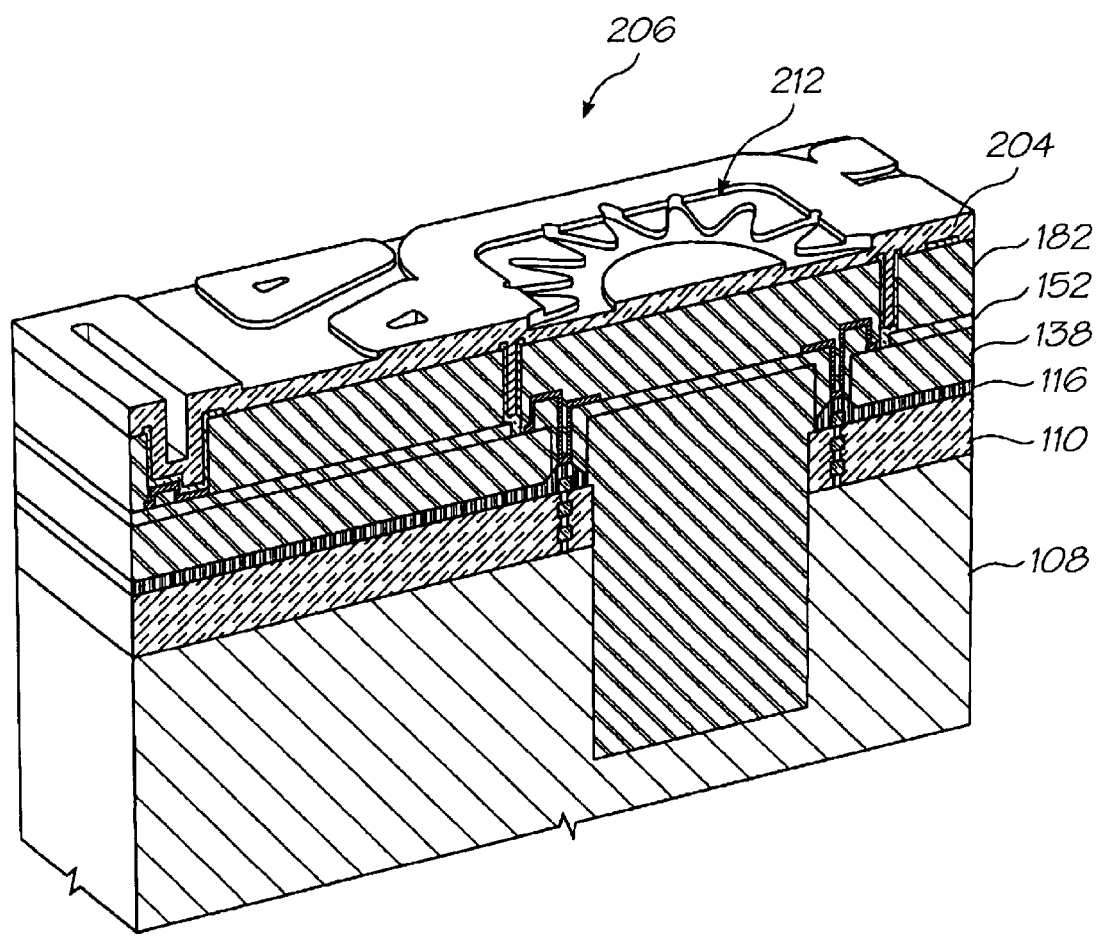
FIG. 40 shows a three-dimensional sectioned view through A—A in FIG. 42 of the stage of FIG. 38 after a selective etching of the dielectric layer.
Figure 41:
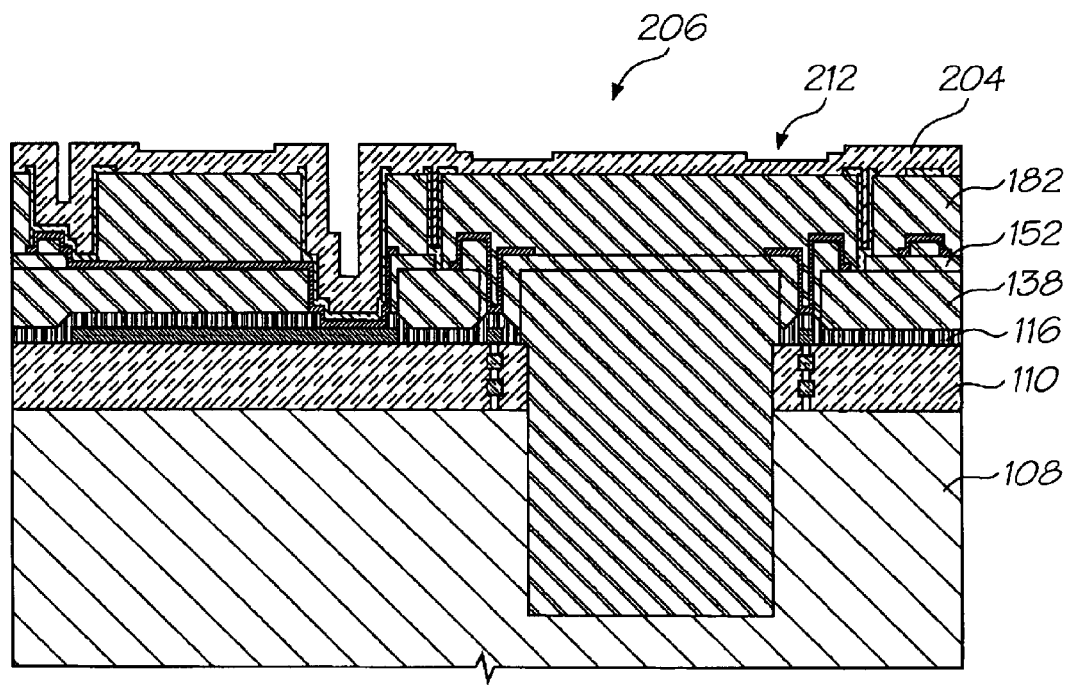
FIG. 41 shows a side sectioned view through B—B in FIG. 42 of the stage of FIG. 40.

In FIGS. 40 and 41, reference numeral 206 generally indicates the structure 202 with a nozzle rim 208 etched into the layer 204. With reference to the preceding figures, like reference numerals refer to like parts, unless otherwise specified.

Figure 42:
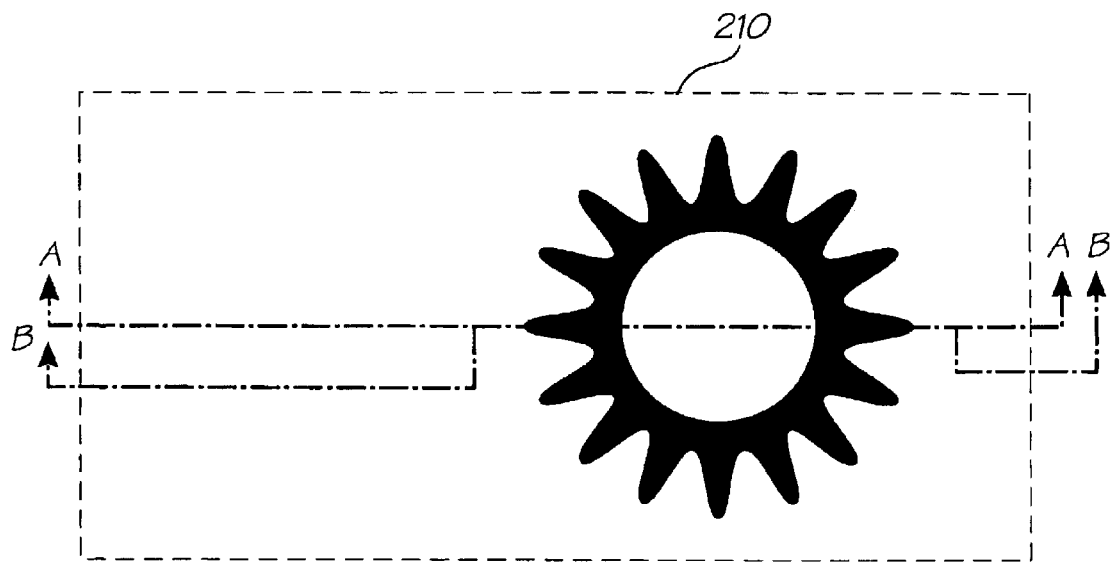
FIG. 42 shows a mask used in the selective etching of the dielectric layer.

In this step, approximately 1 micron of resist material is spun on to the structure 202. A mask 210 in FIG. 42 is used together with a photolithographic process to form an image of the nozzle rim 94 on the resist material.

The photolithographic process is a 1.0 micron stepper process or better. Further, the mask bias is +0.2 microns and the alignment is +/−0.25 microns.

The resist material is developed and undergoes a soft bake process. The resist material is a positive resist material and it follows that the resultant image can be easily deduced from the mask 210.

The layer 204 of silicon nitride is then etched to a depth of 0.6 micron +/−0.2 micron so that a recess 212 to be positioned about the nozzle rim 94 is formed.

It will be appreciated that this process is an initial stage in the formation of the roof wall 32 as described earlier.

The resist material is wet or dry stripped.

Figure 43:
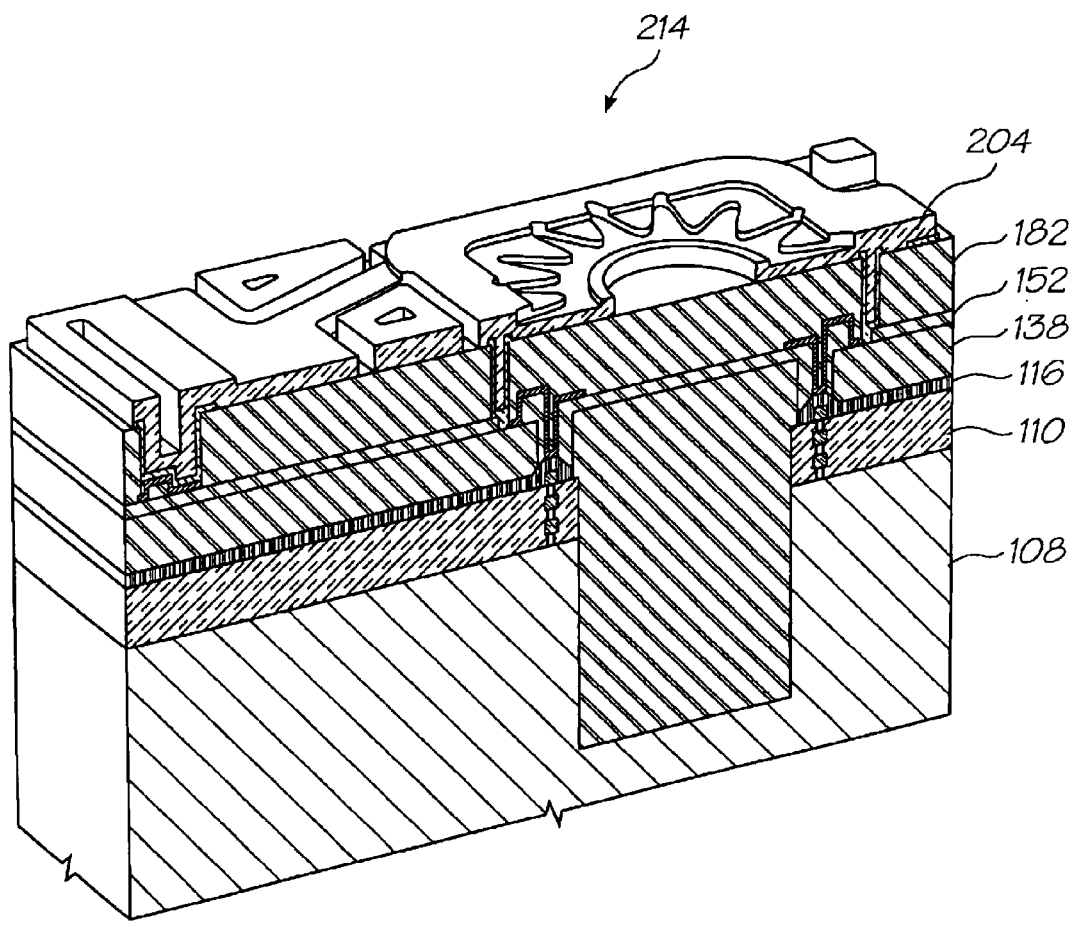
FIG. 43 shows a three-dimensional sectioned view through A—A in FIG. 45 of the stage of FIG. 40 after a further selective etching of the dielectric layer.
Figure 44:
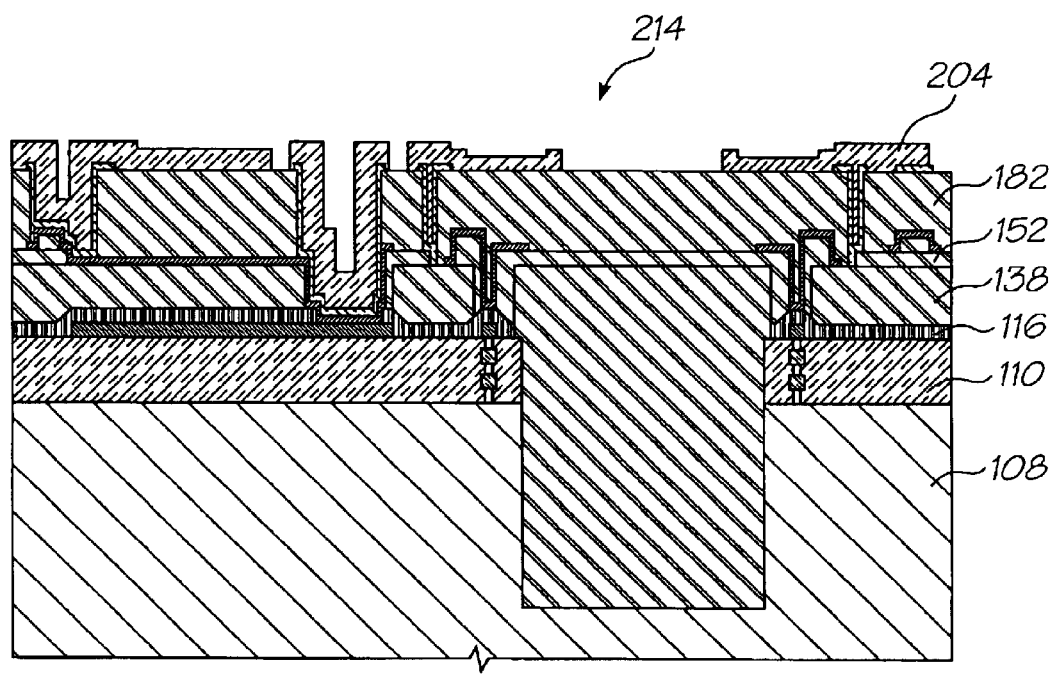
FIG. 44 shows a side sectioned view through B—B in FIG. 45.

In FIGS. 43 and 44, reference numeral 214 generally indicates the structure 206 subsequent to the layer 204 of silicon nitride being subjected to a further etching process. With reference to the preceding figures, like reference numerals refer to like parts, unless otherwise specified.

Figure 45:
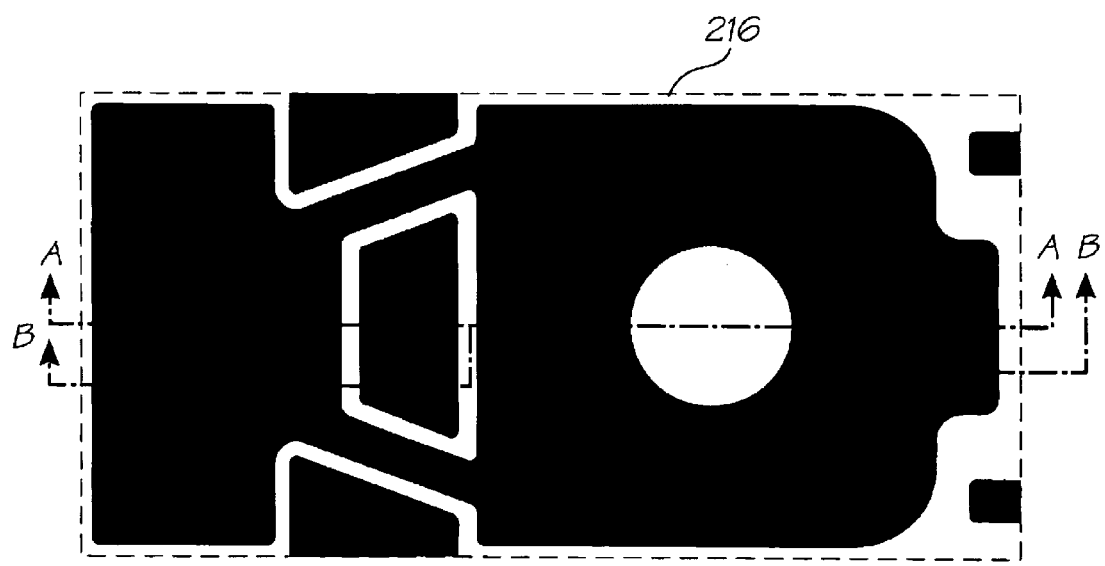
FIG. 45 shows a mask used for the further selective etching of the dielectric layer.

At this stage, approximately 1.0 micron of resist material is spun onto the structure 206. A mask 216 shown in FIG. 45 is used together with a photolithographic process to form an image on the layer 204.

The resist material is a positive resist material. It follows that the image can easily be deduced from the mask 216.

The photolithographic process is a 0.5 micron stepper process or better. Further, the mask bias is +0.2 micron and the alignment is +/−0.15 micron.

The image is then developed and undergoes a soft bake process. Subsequently, a timed etch of the silicon nitride takes place to a nominal depth of approximately 1.5 microns.

The result of this process is clearly indicated in FIGS. 43 and 44. As can be seen, this process results in the sandwiching effect created with the anchor portions 64 of the thermal actuator 60, as described earlier in the specification. Furthermore, the silicon nitride of the fulcrum formation 92 is formed. Still further, this process results in the formation of the roof wall 32 and the extended portion 102 of the roof wall 32. Still further, development of the image results in the creation of the ink ejection port 44.

It is to be noted that alignment with the previous etch is important.

At this stage, it is not necessary to strip the resist material.

Figure 46:
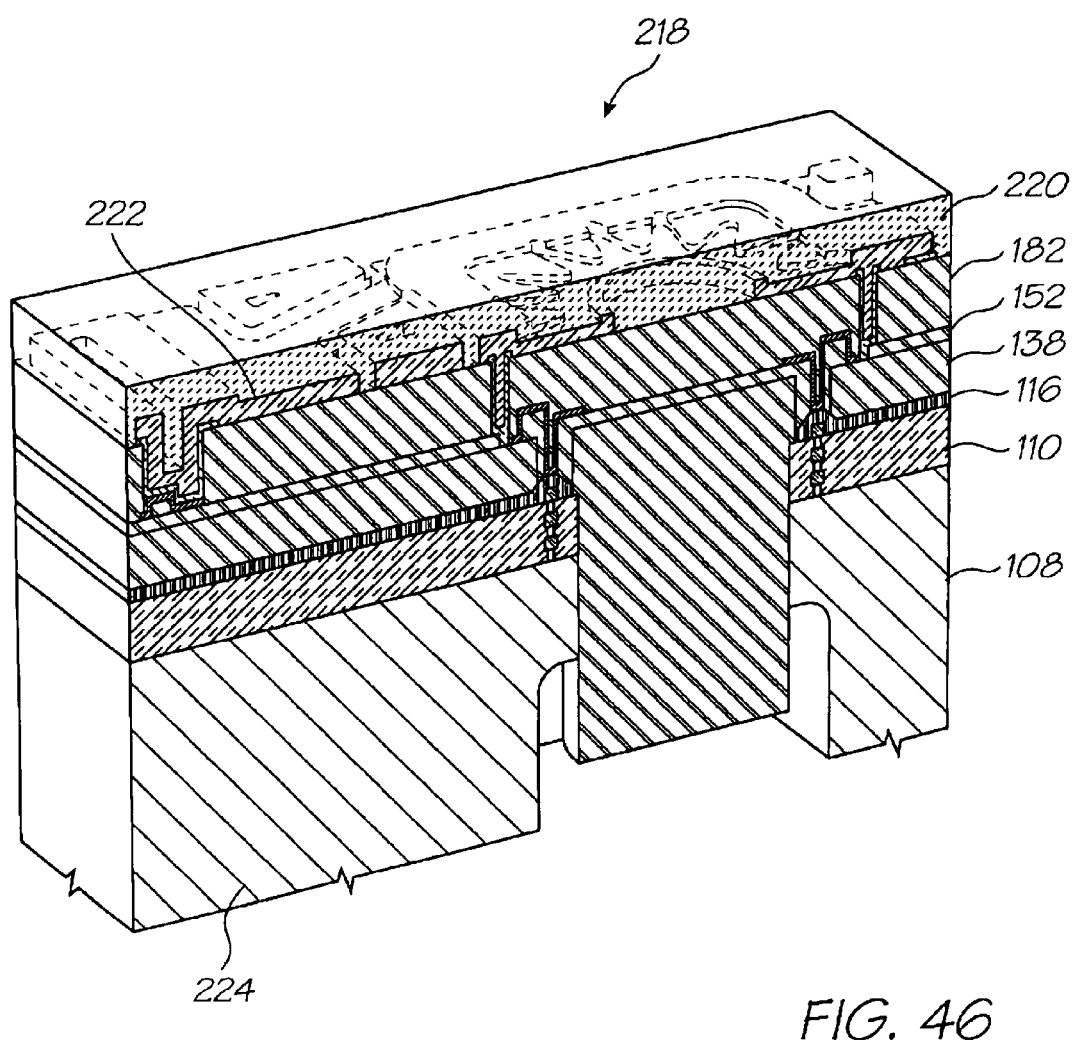
FIG. 46 shows a three-dimensional sectioned view through A—A in FIG. 48 of the stage of FIG. 43 with a resist layer deposited on the dielectric layer and subsequent to a preliminary back etching of the wafer substrate.
Figure 47:
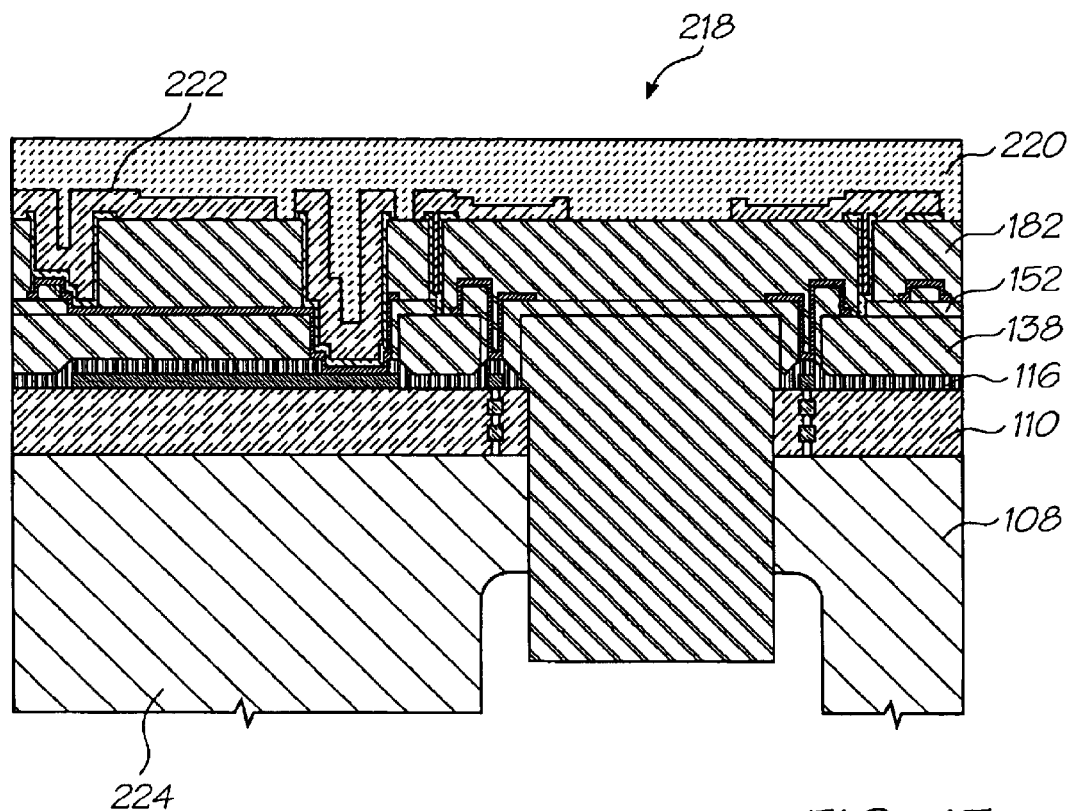
FIG. 47 shows a side sectioned view taken through B—B in FIG. 48 of the stage of FIG. 46.

In FIGS. 46 and 47, reference numeral 218 generally indicates the structure 214 with the wafer substrate 108 thinned and subjected to a back etching process.

During this step, 5 microns (+/−2 microns) of resist 220 are spun on to a front side 222 of the structure 214. This serves to protect the front side 222 during a subsequent grinding operation.

A back side 224 of the CMOS wafer substrate 108 is then coarsely ground until the wafer 108 reaches a thickness of approximately 260 microns. The back side 224 is then finely ground until the wafer 108 reaches a thickness of approximately 260 microns. The depth of the grinding operations depends on the original thickness of the wafer 108.

After the grinding operations, the back side 224 is subjected to a plasma thinning process that serves to thin the wafer 108 further to approximately 200 microns. An apparatus referred to as a Tru-Sce TE-200INT or equivalent can carry out the plasma thinning process.

The plasma thinning serves to remove any damaged regions on the back side 224 of the wafer 108 that may have been caused by the grinding operations. The resultant smooth finish serves to improve the strength of the print head chip 12 by inhibiting breakage due to crack propagation.

At this stage, approximately 4 microns of resist material is spun on to the back side 224 of the wafer 108 after the thinning process.

Figure 48:
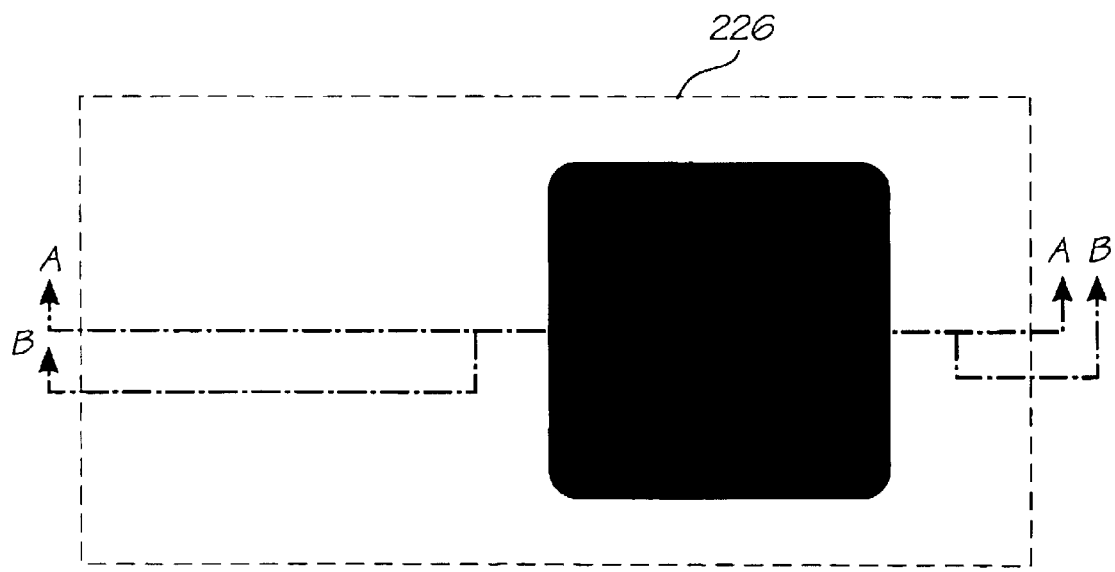
FIG. 48 shows a mask used for the preliminary back etching of the wafer substrate.

A mask 226 shown in FIG. 48 is used to pattern the resist material. The mask bias is zero microns. A photolithographic process using a suitable backside mask aligner is then carried out on the back side 224 of the wafer 108. The alignment is +/−2 microns.

The resultant image is then developed and softbaked. A 190 micron, deep reactive ion etch (DRIE) is carried out on the back side 224. This is done using a suitable apparatus such as an Alcatel 601E or a Surface Technology Systems ASE or equivalent.

This etch creates side walls which are oriented at 90 degrees +/−0.5 degrees relative to the back side 224. This etch also serves to dice the wafer. Still further, this etch serves to expose the sacrificial material positioned in the ink inlet channel 22.

Figure 49:
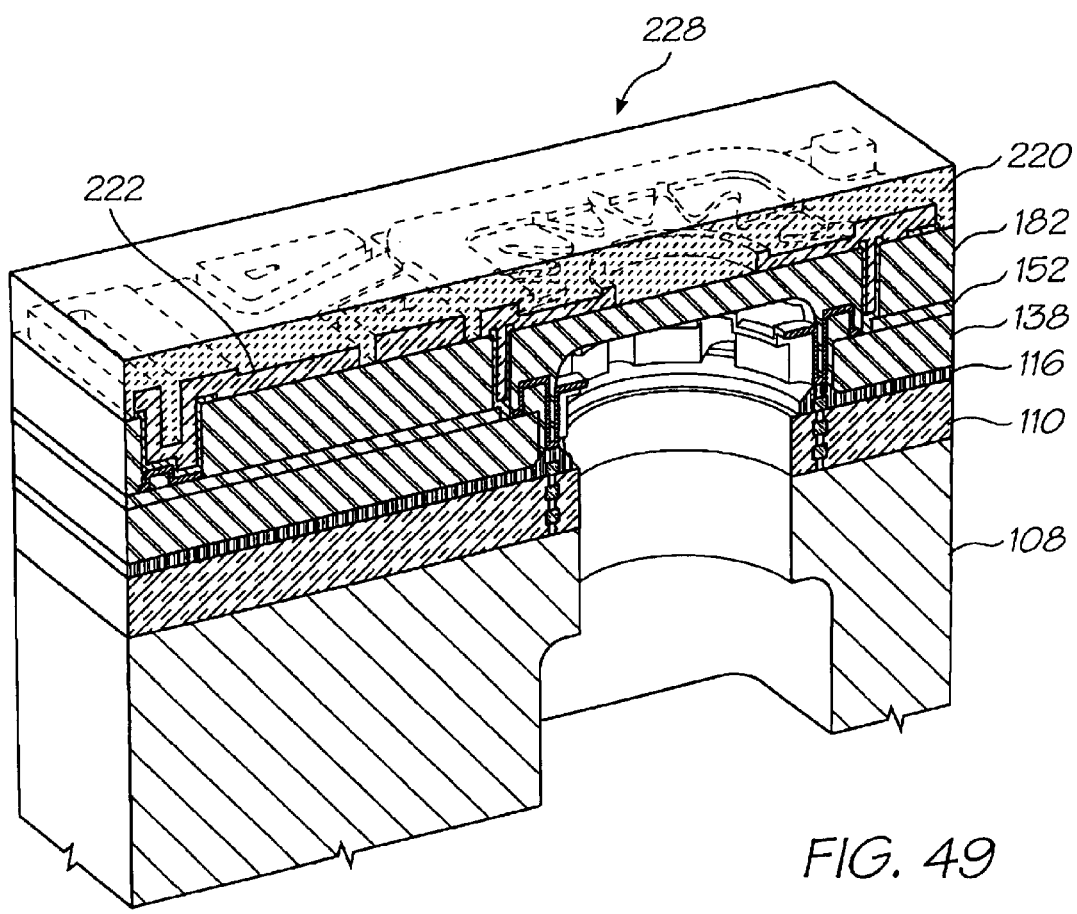
FIG. 49 shows a three-dimensional sectioned view of the stage of FIG. 46 subsequent to a secondary back etching of the material of the first sacrificial layer positioned in an inlet and nozzle chamber of the nozzle arrangement.
Figure 50:
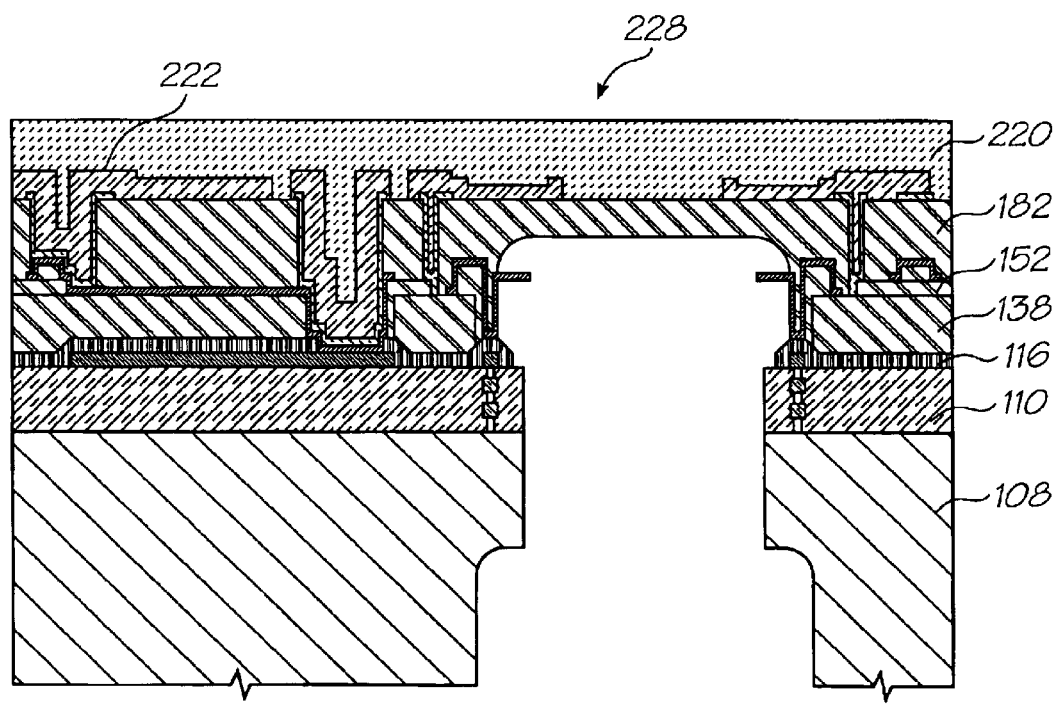
FIG. 50 shows a side sectioned view of the stage of FIG. 49.

In FIGS. 49 and 50, reference numeral 228 generally indicates the structure 218 subjected to an oxygen plasma etch from the back side 224.

In this step, an oxygen plasma etch is carried out to a depth of approximately 25 microns into the ink inlet channel 22 to clear the sacrificial material in the ink inlet channel 22 and a portion of the sacrificial material positioned in the nozzle chamber 34.

Etch depth is preferably 25 microns +/−10 microns. It should be noted that a substantial amount of over etch would not cause significant problems. The reason for this is that this will simply meet with a subsequent front side plasma etch.

Applicant recommends that the equipment for the oxygen plasma etch be a Tepla 300 Autoload PC or equivalent. This provides a substantially damage-free "soft" microwave plasma etch at a relatively slow rate being 100 to 140 nanometers per minute. However, this equipment is capable of etching 25 wafers at once in a relatively low cost piece of equipment.

The oxygen should be substantially pure. The temperature should not exceed 140 degrees Celsius due to a thermally bonded glass handle wafer. The time taken for this step is approximately 2.5 hours. The process rate is approximately 10 wafers per hour.

Figure 51:
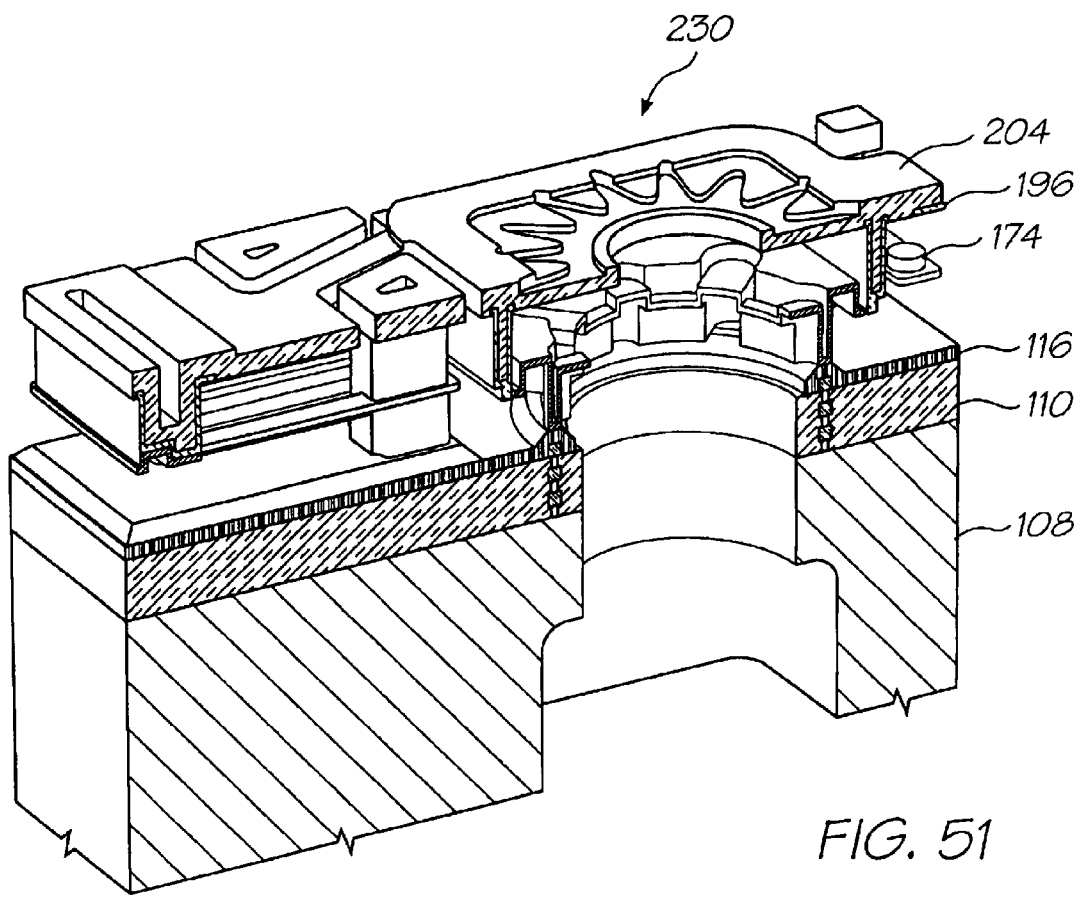
FIG. 51 shows three-dimensional sectioned view of the stage of FIG. 49 with all the sacrificial material and resist material removed.
Figure 52:
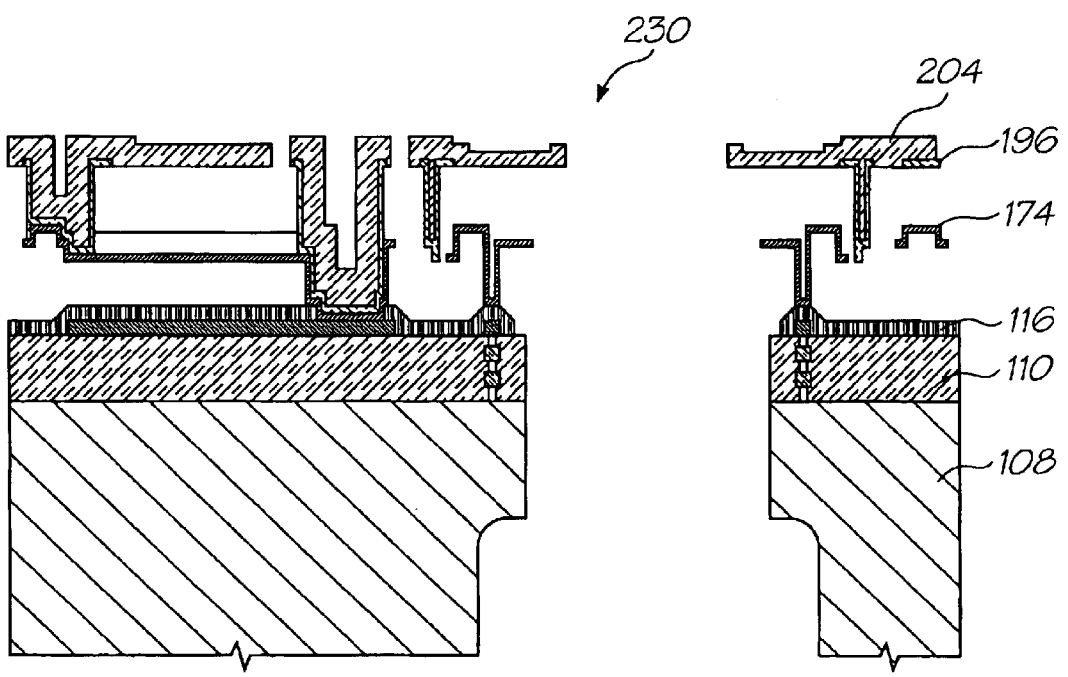
FIG. 52 shows a side sectioned view of the stage of FIG. 51.

In FIGS. 51 and 52, reference numeral 230 generally indicates the structure 228 subsequent to a front side oxygen plasma etch carried out on the structure 228.

During this step, the structure 228 is subjected to an oxygen plasma etch from the front side 222 to a depth of 20 microns +/−5 microns. Substantial over etch is not a problem, since it simply meets with the previous etch from the back side 224. It should be noted that this etch releases the MEMS devices and so should be carried out just before guard wafer bonding steps to minimize contamination.

The Applicant recommends that an apparatus for this step be a Tepla 300 Autoload PC or equivalent. This provides a substantially damage-free "soft" microwave plasma etch at a relatively slow rate of between 100 and 140 nanometers per minute. The slow rate is countered by the fact that up to 25 wafers can be etched at once in a relatively low cost piece of equipment.

The oxygen should be substantially pure. The temperature should not exceed 160 degrees Celsius. The process takes about two hours and the process rate is approximately 12.5 wafers per hour.

During testing, the nozzle arrangement 10 was actuated with approximately 130 nanojoules for a duration of approximately 0.8 microseconds.

It should be noted that the test switch arrangement 100 does not quite close under normal operation. However, when the nozzle arrangement 10 is operated without ink or with a more energetic pulse, the test switch arrangement 100 closes.

It was found that the ejection of ink occurred approximately 4 microseconds after the start of an actuation pulse. Drop release is caused by the active return of the actuator to the quiescent position as the actuator cools rapidly.

Figure 53:
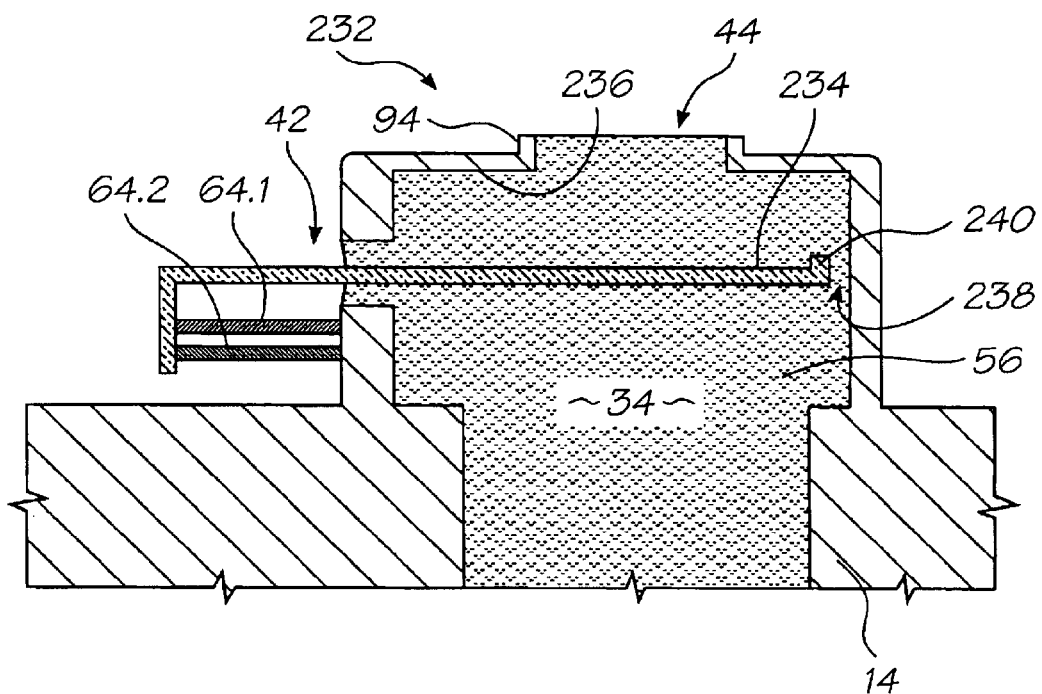
FIG. 53 shows a simplified, side sectioned view of an alternative embodiment of a nozzle arrangement according to the invention.
Figure 54:
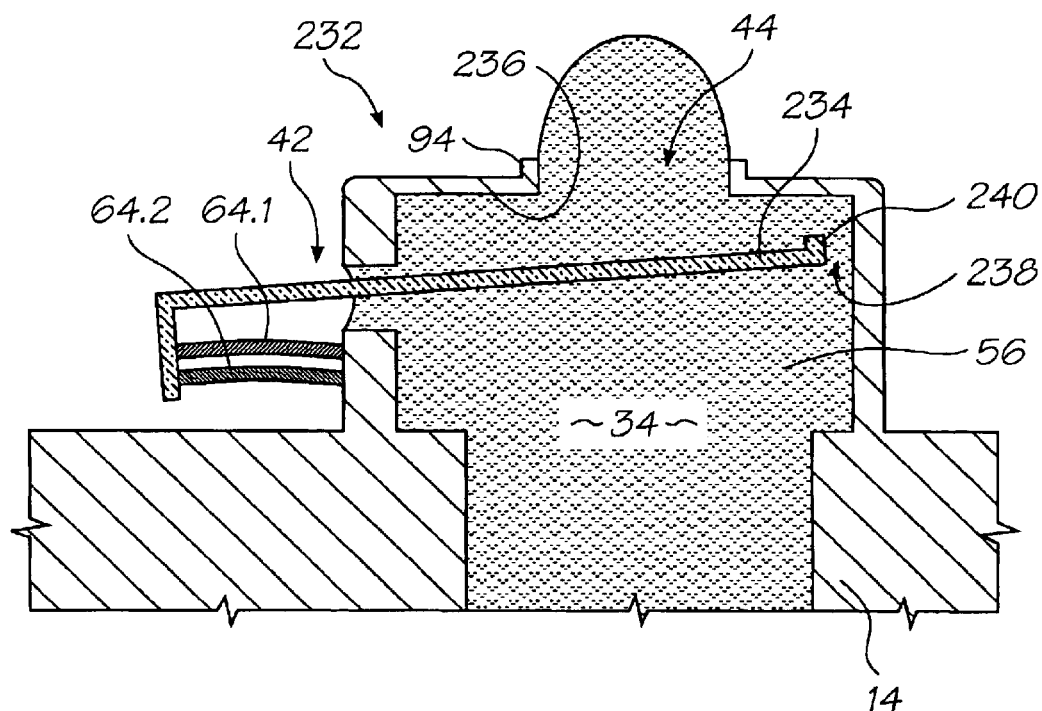
FIG. 54 shows a side sectioned view of the nozzle arrangement of FIG. 53 during actuation.

Turning to FIGS. 53 and 54, there is shown an alternative embodiment of the invention in which reference numerals used in other Figures are used to indicate like features. It will be appreciated that these Figures are schematic in nature, in order to illustrate the operation of the embodiment, and are not intended to represent actual structural details, including the specifics of construction type and materials choice. Those skilled in the art will be able to determine appropriate construction techniques and material choices by referring to the main embodiment and other construction techniques described in the cross-referenced documents.

The nozzle arrangement 232 of FIGS. 53 and 54 differs from the main embodiment in that an operative end 234 of the dynamic structure 42 is enclosed within the nozzle chamber 34, and the ink ejection port 44 is formed above it in a roof portion 236 that partially defines the nozzle chamber 34.

In operation, the operative end 234 of the dynamic structure 42 moves up (rather than down, as in the other embodiment) relative to the substrate 14, which causes an increase in fluid pressure in the region between the operative end 234 and the roof portion 236. Whilst there is a gap 238 between an edge 240 of the operative end 234 and the walls of the nozzle chamber 34, this is considerably smaller in area than the ink ejection port 44. Accordingly, whilst there is some back-leakage of ink past the operative end 234 through the gap 238 during actuation, considerably more ink is caused to bulge out of the ink ejection port 44, as shown in FIG. 54.

As drive current through the active portions 64.1 is stopped, the operative end 234 stops moving towards the roof portion, then begins to move back towards the quiescent position shown in FIG. 53. This causes a bulging, thinning, and breaking of the ink extending from the nozzle as shown in FIG. 7, such that an ink droplet continues to move away from the ink ejection port 44. Refill takes place as described in the main embodiment, and the nozzle arrangement is then ready to fire again.

Although the invention has been described with reference to specific embodiments, it will be appreciated by those skilled in the art that the invention can be embodied in many other forms.

What is claimed is:

1. A nozzle arrangement for an inkjet printhead, the nozzle arrangement including:
    (a) a nozzle chamber for holding ink;
    (b) a passive anchor and an active anchor extending from respective anchor points;
    (c) a moveable structure including a portion in fluid communication with the ink chamber, the moveable structure being connected to the passive and active anchors at connection points distal the respective anchor points such that actuation of the active anchor causes displacement of the portion with respect to the ink chamber;
    (d) a fluid ejection port in fluid communication with the ink chamber for enabling ejection of ink from the chamber by the portion upon actuation of the active anchor;
    wherein the anchor point of at least one of the active and passive anchors is positioned between the nozzle chamber and the connection points.

2. A nozzle arrangement according to claim 1, wherein upon actuation, the moveable structure is moved within a first action plane.

3. A nozzle arrangement according to claim 2, wherein the movement includes a rotational component.

4. A nozzle arrangement according to claim 2, wherein the active anchor is configured to supply, upon actuation, a compressive force between its anchor point and connection point.

5. A nozzle arrangement according to claim 4, wherein the compressive force is supplied substantially parallel to the plane.

6. A nozzle arrangement according to claim 4, wherein the active and passive anchors are configured to bend during actuation of the active anchor due to a change in relative lengths as a result of thermal expansion of the active anchor, the bending contributing to a rotational component of movement of the moveable structure.

7. A nozzle arrangement according to claim 1, wherein the active anchor is a thermal actuator configured to expand due to self-heating when a current is passed therethrough.

8. A nozzle arrangement according to claim 1, wherein the active anchor is a thermal bend actuator.

9. A nozzle arrangement according to claim 1, including at least two of the passive anchors.

10. A nozzle arrangement according to claim 1, including at least two of the active anchors.

11. A nozzle arrangement according to claim 1, wherein the moveable structure is supported at least in part by the passive and active anchors.

12. A nozzle arrangement according to claim 11, wherein ink in the chamber provides fluidic support to the moveable structure by way of surface tension and/or fluid pressure.

13. A nozzle arrangement according to claim 1, wherein the fluid ejection port is disposed in the portion.

14. A nozzle arrangement according to claim 13, wherein the portion is configured to move towards the nozzle chamber upon actuation of the active anchor, thereby causing an increase in pressure in fluid within the nozzle chamber and corresponding expulsion of fluid from the chamber through the fluid ejection port.

15. A nozzle arrangement according to claim 1, where the fluid ejection port is disposed in a roof portion of the nozzle chamber and the portion being spaced away from the fluid ejection port prior to actuation, the nozzle arrangement being configured such that, upon actuation of the active anchor, the portion is urged towards the fluid ejection port, thereby causing fluid to be ejected from the nozzle chamber through the fluid ejection port.

* * * * *